US009923918B2

(12) United States Patent
Nicodemus et al.

(10) Patent No.: US 9,923,918 B2
(45) Date of Patent: *Mar. 20, 2018

(54) METHODS AND SYSTEMS FOR CONTROLLING ACCESS TO COMPUTING RESOURCES BASED ON KNOWN SECURITY VULNERABILITIES

(71) Applicant: International Business Machines Corporation, Armonk, NY (US)

(72) Inventors: Blair Gaver Nicodemus, North Wales, PA (US); Billy Edison Stephens, West Chester, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,509

(22) Filed: Mar. 27, 2017

(65) Prior Publication Data

US 2017/0201545 A1 Jul. 13, 2017

Related U.S. Application Data

(63) Continuation of application No. 14/618,685, filed on Feb. 10, 2015, now Pat. No. 9,608,997, which is a
(Continued)

(51) Int. Cl.
*H04L 12/24* (2006.01)
*H04L 29/06* (2006.01)
(Continued)

(52) U.S. Cl.
CPC ...... *H04L 63/1433* (2013.01); *G06F 11/3495* (2013.01); *G06F 21/55* (2013.01);
(Continued)

(58) Field of Classification Search
CPC ...................................................... H04L 63/10
See application file for complete search history.

(56) References Cited

U.S. PATENT DOCUMENTS 5,666,411 A  9/1997 McCarty
5,673,322 A  9/1997 Pepe et al.
(Continued)

OTHER PUBLICATIONS

Introduction to Radius, Radius—GNU Project—Free Software Foundation (FSF), 5 pages, May 4, 2010.
(Continued)

*Primary Examiner* — Josnel Jeudy
(74) *Attorney, Agent, or Firm* — Pepper Hamilton LLP

(57) ABSTRACT

Methods and systems are provided for fine tuning access control by remote, endpoint systems to host systems. Multiple conditions/states of one or both of the endpoint and host systems are monitored, collected and fed to an analysis engine. Using one or more of many different flexible, adaptable models and algorithms, an analysis engine analyzes the status of the conditions and makes decisions in accordance with pre-established policies and rules regarding the security of the endpoint and host system. Based upon the conditions, the policies, and the analytical results, actions are initiated regarding security and access matters. In one described embodiment of the invention, the monitored conditions include software vulnerabilities.

24 Claims, 7 Drawing Sheets

Related U.S. Application Data continuation of application No. 13/587,505, filed on Aug. 16, 2012, now Pat. No. 8,955,038, which is a continuation of application No. 11/451,950, filed on Jun. 13, 2006, now abandoned.

(60) Provisional application No. 60/752,424, filed on Dec. 21, 2005.

(51) Int. Cl.
| | | |
|---|---|---|
| H04L 29/08 | (2006.01) | |
| G06F 21/62 | (2013.01) | |
| G06F 11/34 | (2006.01) | |
| G06F 21/55 | (2013.01) | |
| G06F 21/57 | (2013.01) | |

(52) U.S. Cl.
CPC ........ *G06F 21/577* (2013.01); *G06F 21/6218* (2013.01); *H04L 63/102* (2013.01); *H04L 63/105* (2013.01); *H04L 63/1416* (2013.01); *H04L 63/20* (2013.01); *H04L 67/10* (2013.01)

(56) References Cited

U.S. PATENT DOCUMENTS

| | | | |
|---|---|---|---|
| 5,732,074 | A | 3/1998 | Spaur et al. |
| 5,987,611 | A | 11/1999 | Freund |
| 6,012,100 | A | 1/2000 | Frailong et al. |
| 6,061,650 | A | 5/2000 | Malkin et al. |
| 6,081,508 | A | 6/2000 | West et al. |
| 6,151,628 | A | 11/2000 | Xu et al. |
| 6,185,609 | B1 | 2/2001 | Rangarajan et al. |
| 6,253,327 | B1 | 6/2001 | Zhang et al. |
| 6,298,445 | B1 | 10/2001 | Shostack et al. |
| 6,377,982 | B1 | 4/2002 | Rai et al. |
| 6,453,035 | B1 | 9/2002 | Psarras et al. |
| 6,493,349 | B1 | 12/2002 | Casey |
| 6,539,482 | B1 | 3/2003 | Blanco et al. |
| 6,643,782 | B1 | 11/2003 | Jin et al. |
| 6,654,891 | B1 | 11/2003 | Borsato et al. |
| 6,694,437 | B1 | 2/2004 | Pao et al. |
| 6,732,270 | B1 | 5/2004 | Patzer et al. |
| 6,748,543 | B1 | 6/2004 | Vilhuber |
| 6,751,729 | B1 | 6/2004 | Giniger et al. |
| 6,760,444 | B1 | 7/2004 | Leung |
| 6,766,453 | B1 | 7/2004 | Nessett et al. |
| 6,778,498 | B2 | 8/2004 | McDysan |
| 6,785,823 | B1 | 8/2004 | Abrol et al. |
| 6,850,943 | B2 | 2/2005 | Teixeira et al. |
| 6,874,139 | B2 | 3/2005 | Krueger et al. |
| 7,058,821 | B1 | 6/2006 | Parekh et al. |
| 7,185,192 | B1 | 2/2007 | Kahn |
| 7,243,148 | B2 | 7/2007 | Keir et al. |
| 7,673,323 | B1 | 3/2010 | Moriconi |
| 7,805,752 | B2 | 9/2010 | Newstadt et al. |
| 8,091,117 | B2 * | 1/2012 | Williams ............ H04L 41/0853 726/3 |
| 8,352,998 | B1 * | 1/2013 | Kougiouris ............ H04L 63/20 726/1 |
| 2002/0138756 | A1 | 9/2002 | Makofka et al. |
| 2002/0199203 | A1 | 12/2002 | Duffey et al. |
| 2003/0074580 | A1 | 4/2003 | Knouse et al. |
| 2003/0105978 | A1 | 6/2003 | Byrne |
| 2003/0135611 | A1 | 7/2003 | Kemp et al. |
| 2003/0172292 | A1 | 9/2003 | Judge |
| 2004/0005886 | A1 | 1/2004 | Oda et al. |
| 2004/0088565 | A1 | 5/2004 | Norman et al. |
| 2004/0103310 | A1 * | 5/2004 | Sobel .................... H04L 63/105 726/15 |
| 2004/0107360 | A1 | 6/2004 | Herrmann et al. |
| 2004/0123162 | A1 | 6/2004 | Antell et al. |
| 2004/0167984 | A1 | 8/2004 | Herrmann |
| 2004/0193907 | A1 | 9/2004 | Pantanella |
| 2004/0221174 | A1 | 11/2004 | Le Saint et al. |
| 2005/0015622 | A1 | 1/2005 | Williams et al. |
| 2005/0033596 | A1 | 2/2005 | Tummolo |
| 2005/0044418 | A1 | 2/2005 | Miliefsky |
| 2005/0060537 | A1 | 3/2005 | Stamos et al. |
| 2005/0086511 | A1 * | 4/2005 | Balacheff ................ G06F 21/57 726/34 |
| 2005/0132225 | A1 | 6/2005 | Gearhart |
| 2005/0138408 | A1 | 6/2005 | Vanover et al. |
| 2005/0144475 | A1 | 6/2005 | Sakaki et al. |
| 2005/0154885 | A1 | 7/2005 | Viscomi et al. |
| 2005/0166065 | A1 | 7/2005 | Eytchison et al. |
| 2005/0172142 | A1 | 8/2005 | Shelest et al. |
| 2005/0188065 | A1 | 8/2005 | O'Rourke et al. |
| 2005/0223221 | A1 | 10/2005 | Proudler et al. |
| 2005/0246767 | A1 | 11/2005 | Fazal et al. |
| 2007/0124803 | A1 | 5/2007 | Taraz |
| 2007/0143827 | A1 | 6/2007 | Nicodemus et al. |
| 2007/0143851 | A1 | 6/2007 | Nicodemus et al. |
| 2010/0242082 | A1 | 9/2010 | Keene et al. |

OTHER PUBLICATIONS

Overview 1, Fiberlink: Secure Remote Access Systems and Secure Broadband Services, Jul. 12, 2005, 2 pages.
Overview 2, Fiberlink: Secure Remote Access Systems and Secure Broadband Services, Jul. 12, 2005, 2 pages.
Security Solutions that are Persistent and Pervasive . . . Yet Transparent to the End User, Fiberlink: Secure Remote Access Systems and Secure Broadband Services, Jul. 12, 2005, 2 pages.
Virtual Private Networking in Windows 2000: An Overview, Microsoft Windows 2000 Server (1999) 28 pages.
Wi-Fi Security at Work and on the Road, 5 pages, Jun. 9, 2005.
Davies, Joseph, Radius Protocol Security and Best Practices, Microsoft Windows 2000 Server (Jan. 2002), 16 pages.
Tyson, Jeff, How Virtual Private Networks Work, Howstuffworks, (Jul. 12, 2005), 10 pages.
Novell eDirectory 8.7 Quick Look, http://www.novell.com/products/edirectory/quicklook.html, 2 pages, May 25, 2010.
Novell eDirectory, Directory Services, Technical White Paper, www.novell.com, 23 pages, May 25, 2010.
Novell Secure Login Features and Benefits, http://www.novell.com/products/securelogin/features.html, 2 pages, Jun. 12, 2012.
Novell Secure Login Quick Look, http://www.novell.com/products/securelogin/quicklook.html, 2 pages, Sep. 30, 2002.
International Search Report dated Feb. 6, 2008 from PCT/US06/048720.

* cited by examiner

METHODS AND SYSTEMS FOR CONTROLLING ACCESS TO COMPUTING RESOURCES BASED ON KNOWN SECURITY VULNERABILITIES

CROSS-REFERENCE TO RELATED APPLICATIONS

This application is a continuation application of U.S. application Ser. No. 14/618,685, filed Feb. 10, 2015, which is a continuation application of U.S. application Ser. No. 13/587,505, filed Aug. 16, 2012, now U.S. Pat. No. 8,955,038, issued Feb. 10, 2015, which is a continuation application of U.S. application Ser. No. 11/451,950, filed Jun. 13, 2006, now abandoned, which claims the benefit of U.S. Provisional Application No. 60/752,424 filed Dec. 21, 2005, each of which is incorporated herein by reference in its entirety.

This application is related to U.S. patent application Ser. No. 11/451,689 Titled: Methods And Systems For Intelligently Controlling Access to Computing Resources, filed Jun. 13, 2006, now abandoned, the entirety of which is incorporated herein by reference.

FIELD OF THE INVENTION

The present invention relates generally to electronic computer security, and more specifically to methods and systems for controlling access to computing resources based on known computing security vulnerabilities.

BACKGROUND OF THE INVENTION

Electronic communication is becoming the industry standard for business communications. Increasingly, office files, design documents, employee work products, company information, and most other important business information is being created and stored electronically on desktop computers, laptop computers, handheld computing devices (collectively 'personal computing device' or 'computing device') and company networks. At work, employees access such networks, along with their associated corporate computing resources from their local computing device, on a daily basis in order to perform their jobs. Away from work, employees similarly access such networks and resources, typically through remote connections. Numerous types of electronic connections are ubiquitous in the industry and well known to the reader, for example: dial-up connections, wireless connections, high-speed connections of various types, virtual private network connections, and others.

Security of such electronic networks has become a recognized, challenging and growing problem. Inappropriate and/or unauthorized access to such electronic networks, and the computing resources accessible there through, raises the risk of theft, destruction and/or unauthorized modification of valuable data, information and intellectual property. While local, on-site, security can be easily controlled through physical constraints, remote electronic access to such networks and computing resources, typically referred to as endpoint access control, is a more challenging problem.

Endpoint access controls have followed an incremental, evolutionary path. Prior to the storage of sensitive data and the recognition of the security issues associated therewith, there were no endpoint access controls. However, security issues such as data theft, unauthorized access, fraud, etc., and the resulting concerns, created an industry-wide demand for security solutions.

The first generation of endpoint access control included operating system services that controlled user access to one or more system resources, such as applications, data files, configuration settings, etc. Users were permitted or denied access to these resources based on a variety of factors, such as their login ID (which was authenticated using a secret) and a secured profile of policy settings identifying permissions and/or restrictions. These permissions were generally static in that they were not context sensitive in any other dimension than the user ID. There was no consideration of environmental factors. This static nature of security services embedded into the operating system remains relatively unchanged in many environments, to the present day.

In the next step in the evolutionary path of endpoint security control, a series of point solutions were created that address point security concerns by providing point access control capabilities. Examples of these point solutions include: personal firewalls that restrict inbound and/or outbound access to specified applications, ports, addresses and/or communication protocols; antivirus agents, anti-spyware agents and application white-list management agents that monitor, detect and/or restrict access to specific system resources such as memory, registry keys, etc.; software update agents that automatically update an application if it is not a specified version; data encryption agents that encrypt specific files, the complete contents of specific folders, etc.; and physical access control agents that restrict access to floppy drives, USB drives, CD-ROM drives, etc. These security agents are one-dimensional in that they look at a single aspect of the endpoint's security posture and make decisions on that basis. There is no integration of data across these security agents—all of these security solutions operate autonomously and completely independent of each other, with little or no communications between them or awareness of the state of other applications running on the endpoint. As with operating system security services, these point solutions are also static. The business logic and configurations of these point solutions are not context sensitive. They typically apply the same rules regardless of the user ID, user location, time of day, presence or absence of other security applications on the endpoint, configuration and state of other security or management applications on the endpoint, etc. While providing relatively stable and secure access control, such static endpoint controls remain inflexible and not adaptable to user and business needs. They are very much in use today in many environments.

In the most recent evolutionary step, context awareness has been introduced into the field of endpoint security control. Functional examples of context awareness capabilities on the market today include: if a named application is not running or is not of a specified minimum version, access to network connectivity or certain applications will be restricted or blocked altogether; if a user is in location X (as determined by an assigned IP address, reachability of a network host, or some other method of automated location determination), the user is permitted outbound access using application X and Y to network servers on subnet Z, however if the user is in location Y (alternatively an unknown location), the user is permitted outbound access using application X and W to network servers on subnet V. In each of these examples, access to a resource (in the first case an application, in the second case the network and communications protocols) is context sensitive in the sense that the access privilege is conditional on the current state of the endpoint (in the first case a certain application running, in the second case the current location). However these solutions are limited in that they are only able to assess a limited set of inputs and affect a narrow set of access privileges. Additionally, once an access privilege has been granted, the decision is rarely revisited over the life of the user's connection or access session, i.e. they could come out of compliance subsequent to granting of access and will still retain access.

Today's access control solutions still lack significant functions and capabilities. As one example, they lack the ability to form context-based access control decisions using as decision inputs state information provided by point solutions that are not context aware. Further lacking is the ability to collect endpoint state information from multiple point solutions, collect endpoint state information from the environment itself (e.g. information obtained from the operating system), and integrate the collected information to form a higher-level holistic and intelligent view of the overall endpoint state.

Today's solutions further fail to provide extensibility of the endpoint state information integration function so as to enable the collection and integration of endpoint state information from a wide range of existing and future point solutions, applications and the endpoint environment itself. They lack the ability to define and enforce more granular access control permissions and restrictions, including the extensibility of this granular access control function to future access control objectives.

Today's endpoint securities solutions do not provide the ability to define conditional, parameter-based business logic with flexible compliance models. They lack the ability to define via configuration settings parameter values for different users and user groups, and further lack the ability to optionally and selectively notify an end user when access control restrictions are being enforced on their endpoint.

Further desirable, and lacking, are useful, functional, management reports as well as dynamic, functional and user-friendly access control capabilities.

It will thus be seen that today's endpoint security control systems lack many functionalities and capabilities of importance both to hands-on users and their employers.

SUMMARY OF THE INVENTION

There are provided herein methods and systems for flexibly managing corporate security policies, typically to control access to local or remote computing resources.

In one embodiment of the invention there are provided methods and systems for controlling the operation of a computing system in response to a security vulnerability, one exemplary method comprising: the computing system running software subject to at least one security vulnerability; establishing a policy based on the status of the at least one security vulnerability including at least one rule and an analysis method for determining compliance with the rule; receiving information relating to the status of the at least one security vulnerability of the software program; processing the information relating to the status using the analysis method; determining, based on the processing, the compliance of the at least one security vulnerability in relation to the rule; and controlling, based on the determining, the operation of the computing system.

In another embodiment of the invention there are provided methods and systems for controlling the access of an endpoint computing system to a host computing system in response to a security vulnerability, an exemplary method comprising: identifying within at least one of the endpoint and host systems a plurality of conditions, each condition having a state; operating on at least one of the host computing system and the endpoint computing system a software program subject to at least one security vulnerability; establishing a policy based on the status of the at least one security vulnerability and the state of each of the plurality of conditions, the policy including at least one rule and an analysis method for determining compliance with the rule; receiving information relating to the status of the at least one known security vulnerability of the software program; receiving information relating to the state of each of the plurality of conditions; processing the information relating to the status of the at least one known security vulnerability and the state of each of the plurality of conditions using the analysis method; determining, based on the processing, the compliance of the at least one security vulnerability and the plurality of conditions with the rule; and controlling, based on the determining, access of the endpoint system to a resource of the host computing system.

In another embodiment of the invention there are provided methods and systems for generating signals to control the access of an endpoint computing system to a resource in a host computing system, an exemplary method comprising: collecting a state for each of a plurality of conditions in at least one of the endpoint computing system and the host computing system; collecting a status of a known security vulnerability for a software program operating on at least one of the host computing system and the endpoint computing system; identifying a policy for determining access of the endpoint computing system to the resource, the policy including at least one rule and an analysis method for determining compliance with the rule; processing, using the analysis method, the state of each of the plurality of conditions and the status of the known security vulnerability; determining, based upon the processing, if the conditions and the known security vulnerability are in compliance with the rule; and generating, based upon the determining, a signal usable to control the access of the endpoint computing system to the resource.

In yet another embodiment of the invention there are provided methods and systems for developing a compliance policy to control the access of an endpoint computing system to a resource in a host computing system, an exemplary method comprising: identifying a plurality of conditions in at least one of the endpoint computing system and the host computing system, each of the plurality of conditions including an associated state, at least one of the plurality of conditions relating to a risk of a known security vulnerability; and developing a policy for determining the access of the endpoint computing system to the resource, the policy including a rule and at least one analysis method for processing the states of the plurality of conditions to determine if the plurality of conditions are in compliance with the rule.

BRIEF DESCRIPTION OF THE DRAWING FIGURES

These and other objects, features and advantages of the present invention will become apparent from a consideration of the following Detailed Description Of The Invention in conjunction with the drawing Figures, in which.

DETAILED DESCRIPTION OF THE INVENTION

Figure 1:
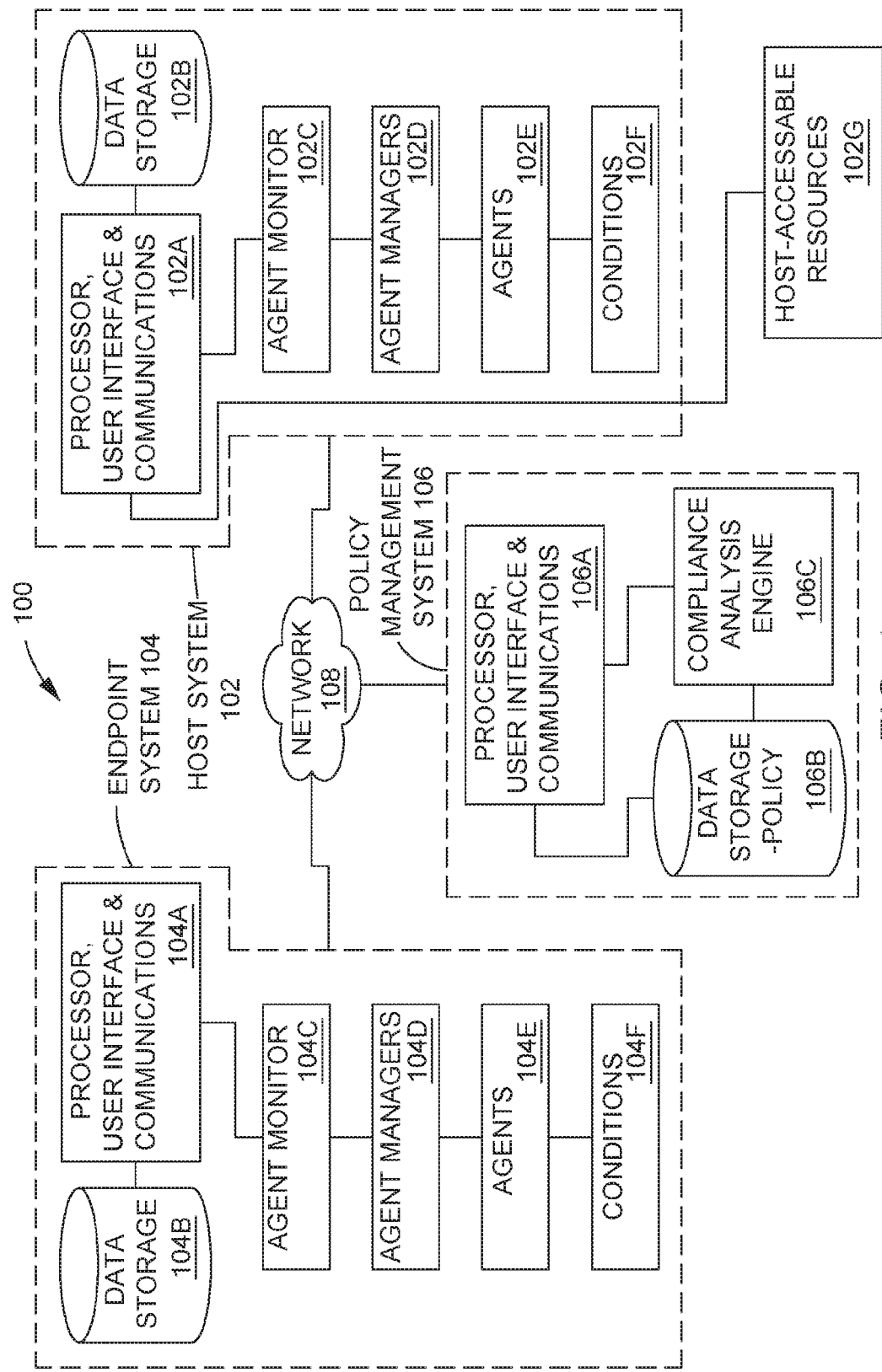
FIG. 1 is a block diagram showing features of a security compliance system in accordance with one embodiment of the present invention.

As used here in, examples and illustrations, as well as descriptive terminology such as "exemplary" and "illustrative" and variants thereof, are descriptive and non limiting.

For purposes of describing the present invention, the following specification is arranged topically, in accordance with the following topics:
Overview
Description Of The System
Establishing Agents And Managers
Establishing Rules And Policies
Administrator Policy Configuration
Integration With Vulnerability Scoring Systems
Analyzing Agent—Collected Condition Data
EndPoint Compliance Assessment Algorithms
   Matrix Analysis Algorithm
   Business Rules-Based Analytical Model For Policy Enforcement
   Boolean Table-Based Analytic Model For Policy Enforcement
   Scoring-Based Analytical Model For Policy Enforcement
   Individual Agent Score Threshold Analysis And Enforcement
   Composite Agent Scoring, Threshold Analysis And Enforcement
   Complementary Individual And Composite Agent Scoring, Threshold Analysis And Enforcement
   Single Level Versus Multi-Level Agent Scoring, Threshold Analysis And Enforcement
   Continuous Reporting Versus Exception Reporting Threshold Analysis and Enforcement
   Matrix Algebra-Based Analytical Model for Policy Enforcement
   Context-Sensitive Threshold and Weighting Adjustments to Quantitative Analytical Models for Policy Enforcement
   Statistics-Based Analytical Model for Policy Enforcement
   Data Summary-Based Statistical Analysis Methods
   Mean-Based Analysis Method
   Moving Average-Based Statistical Analysis Method
   Median-Based Statistical Analysis Method
   Mode-Based Statistical Analysis Method
   Geometric Mean-Based Statistical Analysis Method
   Rate-Based Statistical Analysis Method
   Acceleration Rate-Based Statistical Analysis Method
   Variability-Based Statistical Analysis Methods
      Min-Based, Max-Based and Range-Based Statistical Analysis Method
      Standard Deviation-Based Statistical Analysis Method
      Coefficient of Variation-Based Statistical Analysis Method
      Number of Occurrences-Based Statistical Analysis Method
      Occurrence Frequency-Based Statistical Analysis Method
      Cumulative Distribution-Based Statistical Analysis Method
      Sampling Distribution-Based Statistical Analysis Method
      Sampling Distribution-Based Statistical Analysis Method
   Linear Regression-Based Analysis Method
   Filtering Analysis
   Application of Methods to All Endpoint State Data Elements
   Application of Methods to Non-Numeric Endpoint State Information
   Application of Analytical Methods to Composite Endpoint Compliance Assessments
   Exception Reporting of Analyses Result
   Non-Exclusivity of Analyses Methods
   Combining Analyses Methods
Real Time Adjustment of Sampling Frequency
Managing Endpoint and Host Operation
Communication of Endpoint State Information, Endpoint Compliance Analysis Results And/Or Compliance Actions to a Remote Computer
Implementation Method 1—Endpoint system Only
Implementation Method 2—Centralized endpoint system policy management
Implementation Method 3—Centralized host system policy management
Implementation Method 4—Centralized analysis engine and compliance analysis of individual systems
Implementation Method 5—Centralized analysis engine and compliance analysis of multiple systems
Implementation Method 6—Policy management system as in-band access control mechanism
Data Sharing
Remote Administrator Notification and Control
Overview The present invention provides new and improved methods and systems for flexibly monitoring, evaluating, and initiating actions to enforce security compliance policies. As will be seen from a consideration of the detailed description of the invention, provided below, benefits and advantages of the present invention include:
The collection of a wide range of endpoint state information.
The enumeration of state policies regarding preferred, required and prohibited states.
The enumeration of action policies regarding required, permitted and prohibited actions to take when the endpoint is partially or entirely in or out of compliance with state policies.
An analysis engine enabling comparing current states, state policies and action policies and reaching decisions on actions to permit, prevent, or automatically initiate.
A flexible methodology for assigning numerical values to current state information, state policies and action policies so that a variety of quantitatively-based analysis models can be used to determine security compliance.
An enforcement capability that can operate persistently, constantly measuring compliance, with an ability to dynamically adjust access privileges subsequent to an initial granting of privileges.

An ability to create and adjust a 'sliding scale' having different levels of overall security risk tolerance or conversely an overall minimum security threshold that allows or prevents access to specific hardware, software and/or computing resources depending on the degree of compliance with level-specific security policies and in particular the specific types of noncompliance that exist at each level.

A compliance analysis engine that supports use of a range of different analytical methods and models so that optimum models can be invoked and applied, depending on situational factors.

The initiation of and controlled access to a wide range of software and hardware actions.

Description of the System

As used here, the terms "illustrative," "example," "includes," and variants thereof are exemplary and not exclusive or otherwise limiting.

With reference now to FIG. 1, there is shown there is shown a system 100, including a host system 102, an endpoint system 104, and a policy management system 106. In accordance with the present invention and conventional use, host system 102 comprises a secure, access—controlled processing system where—to remote systems such as endpoint system 104 connect to access data, processing capacity and host-accessible resources. Policy management system 106 provides rules and policies concerning the connection of remote endpoint systems 104 to host system 102. Host system 102, endpoint system 104, and policy management system 106, are interconnected to communicate through a conventional electronic network 108, such as the Internet.

Considering in detail host system 102, the system is seen to include, in a conventional manner, a processor and user & communications interface 102A, as well as conventional storage components 102B, operating systems and software (typically contained in storage and operated by the processor) and other conventional components. Further associated with host system 102 are a variety of resources, indicated at 102G, accessible directly or indirectly through the host, including, for example: user data, user applications, physical ports, data storage devices, dial adaptors, network interfaces, and other resources as will be apparent to the reader. Further contained within host 102 are a plurality of conditions 102F. These conditions are monitored by agents 102E, the agents collecting and transmitting information to agent managers 102D for aggregation by agent monitor 102F. The various conditions, as well as the agent functions, are described in detail herein below. Host 102 may comprise, for example, a processing system of the type typically owned, managed and/or operated by a business to support the operation of its employees. It may comprise a server, enterprise system, personal computer, laptop, personal digital assistant, mobile communications device such as a 'smart' telephone, or any other type of remotely accessible system. In a conventional manner, host system 102 may include conventional security features for controlling access to the data and resources thereon.

Host system 102 may be consolidated at a single location or comprise a plurality of systems dispersed over multiple locations.

Continuing with reference to FIG. 1, endpoint system 104 comprises any processing system capable of interconnecting with host system 102, for example: a laptop computer, personal computer, server system, enterprise system, personal digital assistant, cellular telephone, 'smart' telephone or other personal device, or any other processing system capable of remotely accessing host system 102 for the purpose of accessing the resources available there on. Endpoint system 104 is seen to include, in a conventional manner, a processor and user & communications interface 104A, as well as conventional storage components 104B, operating systems and software (typically contained in storage and operated by the processor) and other conventional components. Further contained within host 104 are a plurality of conditions 104F. These conditions are monitored by agents 104E, the agents collecting and transmitting information to agent managers 104D for aggregation by agent monitor 104F. The various conditions, as well as the agent functions, are described in detail herein below.

Considering now the details of policy management system 106, in the illustrated embodiment, the system comprises a conventional processing system, for example a server computer, enterprise computer, personal computer or a notebook computer. Accordingly, the system is seen to include, in a conventional manner, a processor and user & communications interface 106A, as well as conventional storage components 106B, operating systems and software (typically contained in storage and operated by the processor) and other conventional components. In accordance with the present invention, policy management system 106 is seen to include a compliance analysis engine 106C as well as various policy information stored within storage system 106B. As will be seen from the description below, compliance analysis engine 106C, typically comprising software in data store 106B running on hardware 106A, functions to receive system condition information and process that condition information in accordance with the security policies, such as are stored within data storage 106B, in order to generate security rules. Analysis engine 106C can comprise a portion of the capacity of processor 106A and/or one or more dedicated and/or shared separate processor(s).

In accordance with a feature of the present invention, the policy data stored within data store 106B can contain multiple sets of policy data for use by different endpoint systems 104, for use by different host systems 102 and for use by the policy management system 106 itself.

Figure 5:
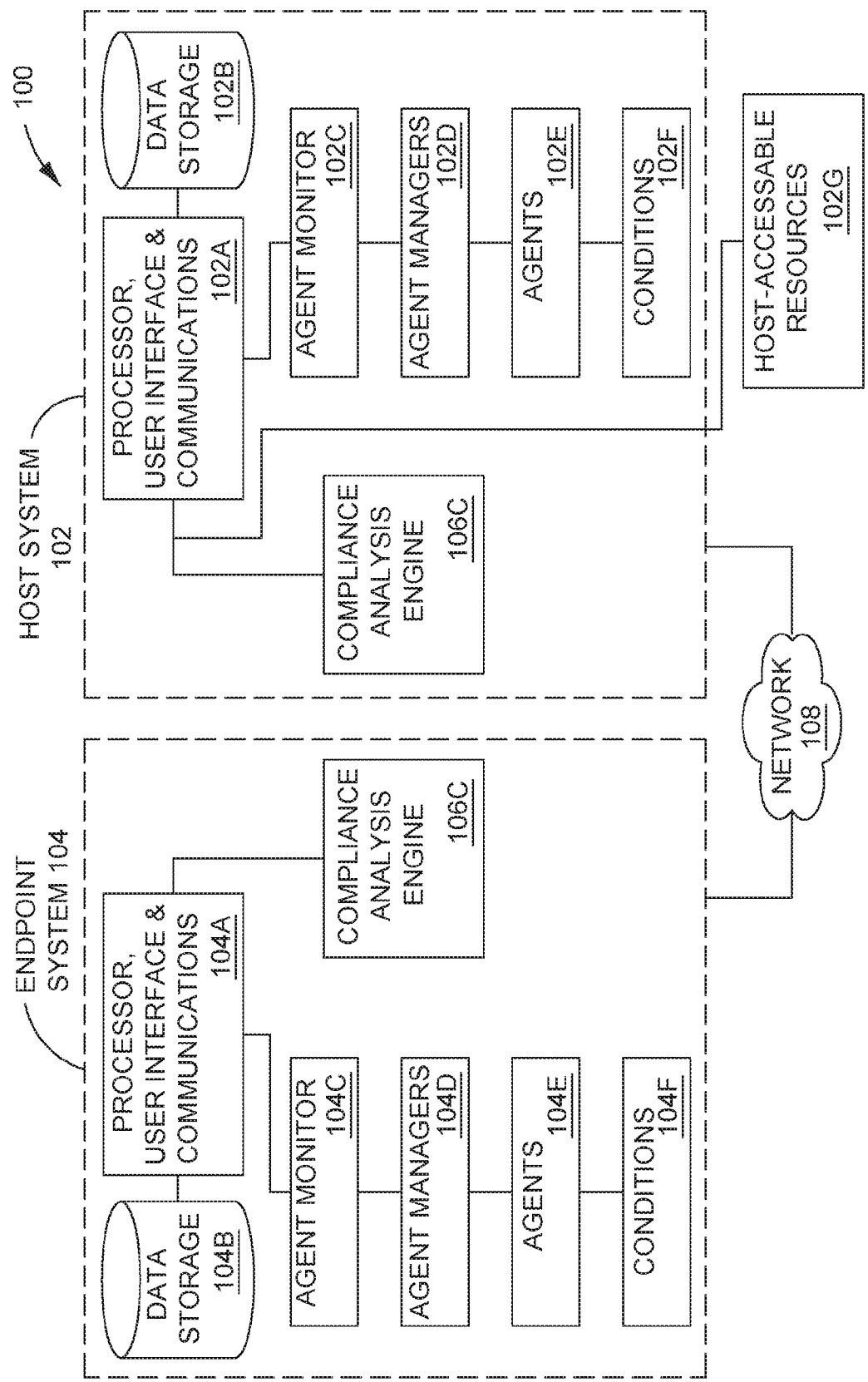
FIG. 5 is a block diagram showing an alternate embodiment of the invention wherein various components of the policy management system are incorporated with in the other computing systems.

In various embodiments as described in further detail below, the functions incorporated and described with respect to policy management system 106 may be contained i) within endpoint system 104, ii) within host system 102, iii) as a stand-alone network device otherwise connected to network 108, and/or iv) distributed in various combinations of the foregoing. See, for example, FIG. 5 wherein a compliance analysis engine 106C is shown in each of endpoint systems 104 (engine 106C') and host system 102 (engine 106C"). It will be understood that the various other features of policy management system 106 may be performed by the existing components of the endpoint and host systems, or otherwise duplicated, replicated, or omitted within those systems as required to perform the appropriate functions as described herein. Further, as used here in, references to the policy management system includes where appropriate only those components and functions necessary to perform the described functions.

In other embodiments of the invention, host system 102 is used to control access to a network, for example a private network. In one such embodiment, host 102 comprises a gateway or other type of access control system to a network such as a private network. In another such embodiment, host 102 functions to make compliance and access assessments in accordance with the present invention, and forwards the results of such assessments to another access controller. In such instances, the present invention is used to control access by an endpoint such as endpoint system 104, to a network, limiting or permitting endpoint system 104 to access specific network resources based on its current level of compliance.

As described herein, the various subsystems, agents, processes and managers can be implemented using hardware components, software components and/or combinations thereof.

Figure 2:
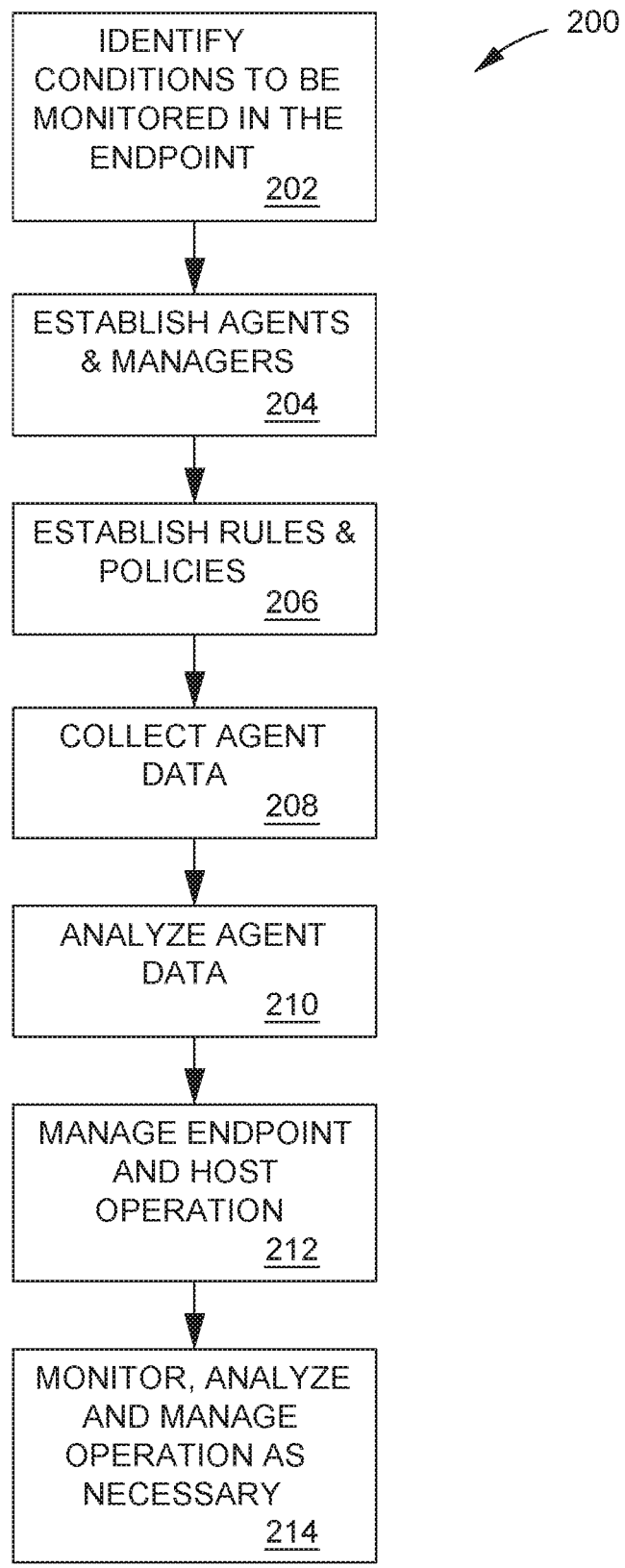
FIG. 2 is a flow chart showing a process for managing security compliance in accordance with an embodiment of the invention.

With reference now to FIG. 2, there is shown a process 200 in accordance with the present invention for controlling the access of a user such as endpoint system to a computing resource. As noted above, the present invention may be used to control access between different systems such as an endpoint system and a host system, or within a system, such as to particular resources available within the system.

Establishing Agents & Managers

As used here in, and generally in accordance with the accepted definition in the art, "agents" operate to determine the status of particular conditions in a system, as described herein the host system 102 and endpoint system 104. It will be understood by the reader that the invention is equally applicable to controlling access to resources within a single system as to between systems. For purposes of explanation, the invention will be described with respect to controlling the access of endpoint system 104 to host system 102. However, as described above, the invention is equally applicable to controlling access within host system 102 and/or endpoint system 104, as well as other computing systems.

Again, as is generally in accordance with the accepted definitions in the art, an "agent manager" operates to control the function of as well as to aggregate data collected by the various agents. An "agent monitor" functions to aggregate the data collected by various agent managers. The various agents, managers and monitors can be implemented in hardware, software, and/or combinations thereof.

When used to describe the operation of an agent, the terms "state," "condition" and variants thereof are used synonymously to describe the status of the agent.

Considering first the selection of conditions to monitor within endpoint 104 (step 202), there are many different data sources and data elements that can be examined to assess the state of the endpoint, form compliance assessments, and ultimately make policy-based access control decisions regarding local and remote computing resources.

Individual configuration data elements such as antivirus heuristics scanning status, and state data elements such as 'is antivirus currently operating', can be obtained by establishing an interface to an agent specifically designed to collect and report that piece of information. Such configuration states and data elements are indicated in the drawing FIG. 1 as conditions 104F. The agents 104E can comprise a component of the endpoint system or an external service provided by third party software. The endpoint system includes one or more agent managers 104D. These agent managers collect state information from individual agents 104E or the general computing environment, including the operating system version, registry settings, and others as will now be apparent to the reader. An agent monitor 104C functions to collect and process information from the various agent managers 104D, in the manner described below.

A given inspection agent may provide a granular or broad means to indirectly assess configuration state and data elements and may provide numerous pieces of state configuration and state information to the endpoint's agent managers 104D. For example the response to a query regarding the state of a configuration setting might simply be true or false, whereas the response to a query regarding what viruses are currently being monitored for could be an enumerated list of thousands of virus names.

Agents running on endpoint 104 and performing related or similar functions can generally be grouped into categories. For example, an antivirus client/agent, an anti-spyware agent, a content filtering agent and an applications white-list agent can be grouped into a 'security agent' category.

It will be understood by the reader that the universe of monitorable conditions, sources of state information, will expand and evolve over time. For example, new operating system services may come available, new categories of security applications may emerge, security point solutions may become integrated, transport technologies will continue to evolve, transport hardware will evolve, features of security point solutions will evolve, etc. Therefore the present invention contemplates the addition, modification, or removal of agent components as needed over time. Furthermore, different customer needs will warrant monitoring or conversely not warrant monitoring of selected conditions. The present invention is extensible to be able to take advantage of new sources of information as they become commercially available or as customers request support for new or existing products. The agents, managers and policies are also desirably flexible since, depending on the presence or absence of operating system facilities, third party applications, etc. not all condition information may be available simultaneously. Therefore endpoint 104 is configured so as to be able to add, modify, or remove agents on a per user basis and to further customize or adapt a given configuration of the endpoint's software components over time.

Illustrative conditions 104F that are available and may be used for assessing endpoint state information are as follows. Note that not all of these conditions will be needed at any one point in time, i.e. when different system events occur, different pieces of endpoint state information become relevant. It will be understood that different items of interest may be monitored at different times, and different users will have different items they are interested in monitoring.

User state information includes:
User ID, User group(s) membership (e.g. reseller, customer, business unit, division, department, etc.),
User role(s)/position (e.g. sales, executive, clerical worker, mobile professional, system administrator, etc.),
User workgroup, and
User security group.
  Authentication state information includes:
Authentication method (e.g. no authentication, reusable password, one time password, biometrics, smart card, etc.),
Authentication source (E.g. local to the machine or to a remote authentication database across a network),
Authentication success/failure result, Password strength, Age of password, and Number of successive login failures.
  Endpoint hardware Information includes:
Endpoint hardware owner (public kiosk, user-owned, corporate asset, etc.)
Endpoint hostname
Hardware configuration and state, such as:
  CPU type
  Total system memory
  Free memory
  Etc.
BIOS:
  Vendor
  Version
  Individual settings Drive mappings
Supported pointing devices
Enabled and active pointing devices
Current power source
Battery charge level
System temperature
Endpoint Operating System Information includes:
Base OS version
Installed service packs
Installed patches
State of OS configuration settings (enabled/disabled options, services settings, option settings, etc.)
Currently active OS services
Default language
Installed language packs
Operating System Services Information includes:
Intra-application and Internet-application copy/paste service (e.g. Microsoft Windows Clipboard)
Network Services Information includes:
DNS:
   Current primary and secondary DNS servers
   Size of DNS cache
   Number of DNS queries
   DNS queries serviced by local DNS cache
ICMP:
   ICMP messages transmitted
   ICMP messages received
ARP:
   Contents of ARP cache
   Number of ARP requests
   Number of RARP requests
Network protocols enabled
IP settings:
   Current TTL setting for outbound IP packets
   IP address
   Default gateway
   Subnet mask
UDP/TCP
   Window size
HTPP:
   HTTP requests sent
   HTTP request transmission rate
   Number of requests to a given host
   Number of requests to a given domain
   Number of requests to a given IP address or address rangeFile System Information includes:
   Read/write status of a named file
   Access privileges to a named file
   Access privileges to a named folder or directory.
   File being deleted
   File being created
   File being opened
   File being overwritten
Application Information includes:
Installed application information
   Vendor
   Version
   Configuration settings
   License ID
   Digital signature
Running applications
Running processes
Current priority level for each running application
Application being opened
Application being closed
Memory consumed by each running application
Application update history information
Preferred application priority
Number of times an application is opened, per hour, per day, per week, per month, etc.
Transaction response time for specific application transactions
Number of times a specific application transaction occurs
Application-Specific Information includes:
Email:
   Version in use
   Max number of emails per minute
   Number of emails received and in inbox or other mail folders
   Email arrival rate
   Email reception rate
   Email attachment count
   Email attachment size
   Number of recipients in emails sent
Web browser:
   URLs being accessed
Data Information includes:
Local data being accessed
Application accessing the local data
Remote data store being accessed
Application accessing the remote data
Remote data elements be accessed
User access privileges for data being accessed
Data being copied or saved to a local external storage device (e.g. USB thumb drive)
Data being transmitted to, copied to, or saved to a remote location
Remote location data being transmitted to
Remote location data being retrieved from
Specific text strings (including support for wildcards and logical AND/OR/ELSE/NOT combinations) contained in a file, in a document, in an email, in a communications message, etc.
Data Backup Information includes:
Backup program information
   Vendor
   Version
Backup configuration settings:
   Specific data to be backed up (e.g. files, folders, modified documents, tables, records, etc.)
   Backup type (e.g. incremental, whole)
   Backup destination
Amount or volume of data to be backed up
Date of last backup
Date of next backup
Backup agent state (e.g. active, idle)
Antivirus Agent Information includes:
Antivirus agent information
   Vendor
   Version
   Signature files version
Antivirus-specific configuration settings, (e.g. scan whole system, specific folders, specific files, run scan at startup, run scan every X days, signatures update frequency, etc.)
Amount or volume of data to be scanned
Date of last update
Antivirus scanning state (e.g. active, idle)
Personal Firewall Agent Information includes:
Personal firewall agent information
   Vendor
   Version Personal firewall-specific configuration settings (e.g. user notify, silently discard, event logging, event log uploads, blocking enabled/disabled, etc.)
Permitted/Restricted outbound applications, protocols and/or destinations
Permitted/Restricted inbound applications, protocols and/or destinations
Date of last software update
Date of last profile update
Personal firewall state (e.g. actively blocking, blocking disabled, etc.)
VPN Client Information includes:
VPN client program information
   Vendor
   Version
VPN client-specific configuration settings (e.g. default profile, split tunneling, authentication method, etc.)
Date of last software update
Date of last profile update
VPN tunnel state (e.g. connecting, connected, disconnecting, disconnected)
Anti-Spyware Agent Information includes:
Anti-spyware agent information
   Vendor
   Version
   Signature files version
Anti-spyware-specific configuration settings, (e.g. scan, whole system, specific folders, specific files, run scan at startup, run scan every X days, signatures update frequency, etc.)
Date of last update
Anti-spyware agent scanning state, (e.g. active, idle)
Data Encryption Agent Information includes:
Data encryption agent information
   Vendor
   Version
Data encryption-specific configuration settings
   Method of user authentication
   Specific data to be encrypted (e.g. files, folders, modified documents, tables, records, etc.)
   Encryption type (e.g. AES, digital certificate, TPM chip, etc.)
Data encryption agent state, (e.g. active, idle)
Content Filtering Agent Information includes:
Content filtering agent information
   Vendor
   Software version
   Blocked sites file version
Content filtering agent-specific configuration settings
   Method of filtering (e.g. local list, proxy server)
   Specific sites or site categories to be filtered
   Event logging
   Log upload
Content filtering agent state, (e.g. active, idle)
Date of last software update
Date of last filter list update
Local HTTP/HTTPS proxy settings for remote HTTP/HTTPS proxy server
Asset Management Agent Information includes:
Asset management agent information
   Vendor
   Software version
   Asset reporting profile version
Asset management agent-specific configuration settings
   Information being recorded
   Log upload destination server
Asset management agent state, (e.g. active, idle)
Date of last software update
Date of last profile update
Location Information includes:
Geographic location
Physical location on the corporate campus
Location category:
   Directly connected to corporate network
   Home
   Public wireless location
   Hotel
   Approved kiosk
   Public wired broadband location
Remote and connected to corporate network via a VPN
Reachability of specific remote hosts or networks
Time-Based Information includes:
Local time of day
Time of day at destination
Day of week
Day of month
Wireless Connection Information includes:
Permitted SSIDs
Prohibited SSIDs
Suspect SSIDs
Configuration of current wireless connections, e.g.
   Bluetooth:
      Current connection details
      Permitted connections configuration settings
   Wi-Fi and other IEEE 802.1 wireless data communication link protocols
      Current connection details, e.g. ad hoc mode, network node, WEP, WPA, WPA2, 802.1x, key length, etc.
      Permitted connections configuration settings
Available Connection Information includes:
Available network connections
Specific network devices available (specific adapter or modem in use)
Network technologies available (Wi-Fi, wired, mobile data, dial, etc.)
Theoretical bandwidth available
Cost per minute/cost per megabyte
Network service provider
Link encryption options
Active connection information includes:
Specific network device in use
Network technology in use
Theoretical available bandwidth
Current bandwidth
Average bytes/sec output
Average bytes/sec input
Cost per minute/cost per megabyte
Network service provider
Network printing status
Link encryption method
Authentication method
Network bytes received
Network bytes transmitted Subsequent to identifying the various conditions to be monitored within endpoint system 104 (step 202), the various agents 104E and agent managers 104D and agent monitor(s) 104C are identified and configured for monitoring those various conditions (step 204). For example an agent manager 104D may be configured to query a vendor-specific API exposed by a third party antivirus agent, may be configured to query an operating system service periodically to determine if the endpoint has an active network interface and if so, the IP address of that interface, etc. Multiple managers 104D may be separately configured to monitor multiple agents 104E and multiple monitors 104C configured to aggregate manager data. In summary, agent managers are configured to monitor the conditions of interest such as one or more of those described above.

Agents can be free standing external software applications, system services provided by the operating system or dedicated, special-purpose monitoring processes that are part of the monitored system itself. Agents can monitor both software activity and hardware activity. A typical method for monitoring hardware information is through the use of hardware device drivers and other similar operating system services. Examples of freestanding agents are antivirus client, personal firewall, anti-spyware, anti-phishing agents, data backup agents, etc. Agent monitor 104C can comprise software, hardware and/or a combination thereof, and is functional to collect or aggregate the input from the various agents, through the agent managers, and communicate that data for processing as described herein.

Figure 3:
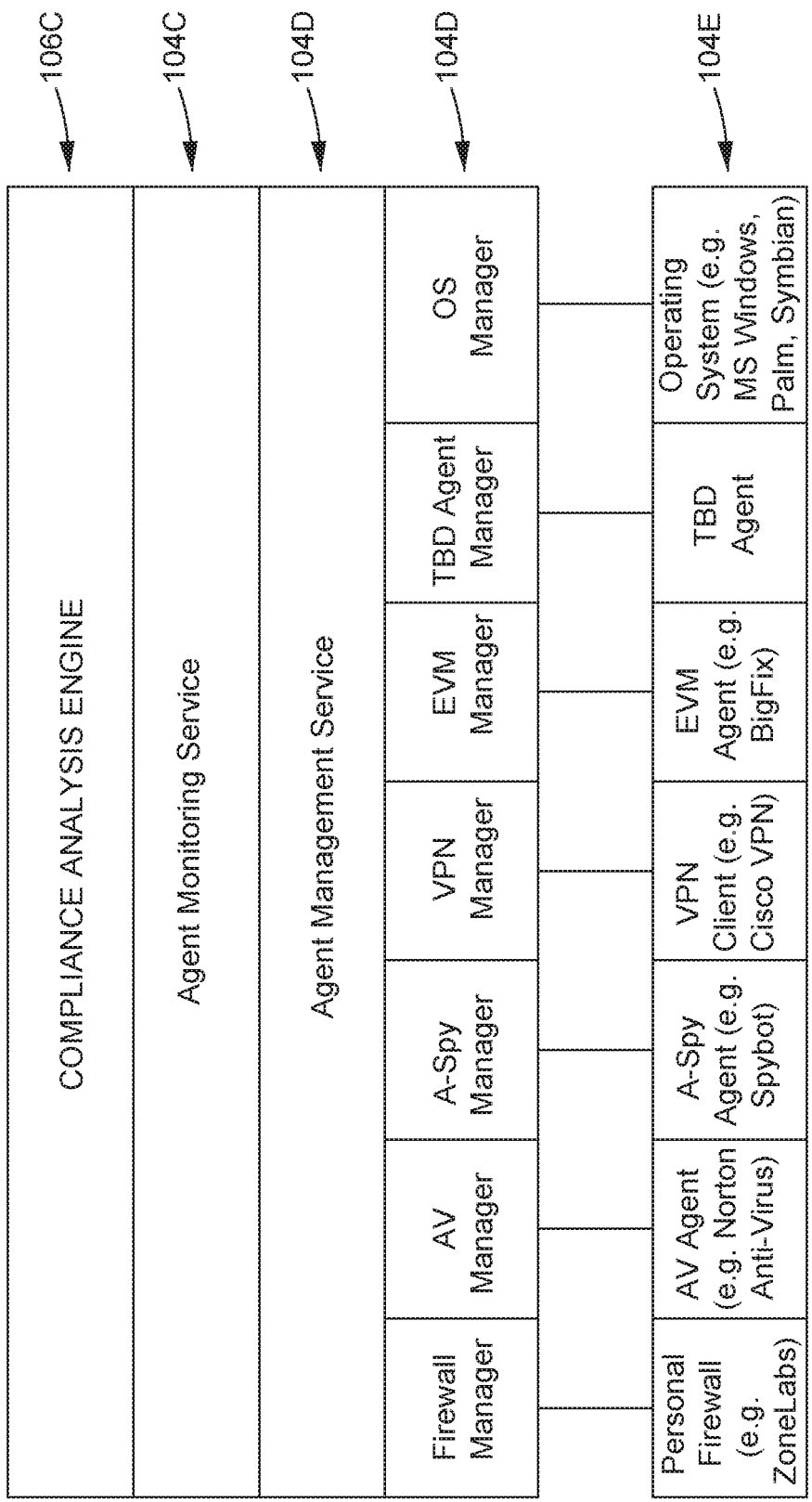
FIG. 3, is a functional block diagram showing the interaction of agents, managers, monitors and compliance engine in a security compliance system.

With reference now to FIG. 3, there is illustrated diagrammatically an exemplary series of agents 104E connected to monitor exemplary endpoint conditions 104F such as those listed above. The agent monitors 104C perform overall endpoint monitoring through the use of individual agent mangers 104D, each of which monitors one or more specific agents 104E, the individual agent managers 104D aggregated by an agent management service 104D'. As previously mentioned, different configurations and policies will require the use of different individual agent managers and different specific agents. Further illustrated in FIG. 3 is the communication of the agent data to the compliance analysis engine 106C for processing in accordance with the methods described herein below.

Establish Rules & Policies

With reference now back to FIG. 2, subsequent to the identification of the conditions to be monitored and the establishment of the various agents, agent managers and agent monitors as described above, there are next established rules and policies for controlling the access to local resources on the endpoint system 104 or remote host system 102 (step 206).

The policies established to control access to host system 102 and/or access to local host resources 102G as described above, can specify a number of behavioral options for endpoint system 104. These policies are typically established by the operator of host system 102 or the administrator of endpoint system 104, and stored in the policies storage section 106B of policy management system 106. Configuration policies specify a number of behavioral options for the client. As described here in, configuration policies include both the configurable behaviors of the compliance analysis engine and the security policies of the systems. Configuration policy behaviors supported by the client include:

- Endpoint inspection management policies, including:
- Enumerated list of endpoint data categories to monitor or not monitor
- Enumerated list of sensors within each category to monitor or not monitor
- Method of monitoring for each sensor (e.g. active polling, or passive receipt of events)
- Frequency of monitoring for each sensor
- Enumerated list of data elements to be sampled with the following parameters identified for each sampled:
  - Whether sampling is to occur a regular basis, or whether it is to be initiated as a result of a system event
  - If sampling is to be initiated in response to a system event:
    - The event (e.g. an application being launched, a network connection being established, a user opening a file, a system login event, an application login event, an antivirus agent compliance violation, etc.)
    - If applicable, a threshold value and type (e.g. 5 times a minute when antivirus compliance score is below 75%, email transmission rates above 5 per minute, etc.)
  - Number of samples to collect for a compliance evaluation cycle
  - Sampling interval (if applicable)
  - Acceleration window interval (if applicable)
  - Whether sampling and results reporting method should utilize a successive stop/start windowing method or a sliding window method (e.g. for moving average-type calculations).
- Enumerated list of data elements to be sampled on a regular or threshold basis, and the corresponding sampling interval
- Enumerated list of policies and thresholds for which the sampling frequency must be adjusted when a threshold is reached. For each policy one or more of the following parameters must be defined:
  - Threshold value
  - Upper and lower threshold value (for range-based thresholds)
  - Sampling parameters (e.g. count, interval, etc.) when out of range
  - Sampling parameters (e.g. count, interval, etc.) when in range
- Compliance Engine Management, including:
- Enumerated list of analytical model(s) to use for different endpoint data elements
  - Business rules
  - Boolean tables
  - Matrix method 1
  - Matrix method 2
  - Mean method
  - Moving average method
  - Variance method
  - Standard deviation method
  - etc.
- Enumerated list of compliance thresholds for different endpoint data elements:
  - Min value
  - Max value
  - Required range (min and max value)
  - Variance
  - Standard deviation
- Composite scoring inputs:
  - Mandatory inputs
  - Exception based
  - Combined
    - Enumerated list of items that are mandatory inputs into the composite score
    - Enumerated list of items that are exception inputs into the composite score
- Composite scoring calculation method:
  - Discrete
  - Time base
    - Sampling interval
    - Number of samples
- Hostname of remote computer management application to which endpoint information should be sent Type of information to send to management application, e.g. raw collected data, compliance analysis results, compliance actions scheduled to occur, etc.
Frequency with which client should query policy management server to look for and retrieve any available policy updates.
Action Management information including:
Enumerated list of action categories to enforce or not enforce
Enumerated list of actions within each action category to enforce or not enforce
Enumerated State Policies information including:
Endpoint Hardware Configuration Policies
  Permitted devices types
  Required device manufacturer
  Required device version
  Minimum free hard drive space
  Required device serial number
  Required device asset tag
  Removable storage device permissions
  Required operating system version
  Required operating system patches
  Required operating system configuration settings
  Permitted operating system configuration settings
  Endpoint Data Storage Device Access Policies information including:
  Prerequisites for a named I/O port or storage device to be permitted to be accessed as read only
  Prerequisites for a named I/O port or storage device to be permitted to be accessed as read/write only
  Prerequisites for a named I/O port or storage device to be permitted to be accessed as write only
  Enumerated list of applications permitted to access named I/O ports or storage devices
  Printer Access Storage Policies
  Prerequisites for a named printer to be permitted to be used
  Named applications allowed to access named printers
  Authentication Policies
  Password reset age or date
  Password expiration age or date
  Required user location to allow password reset activation
  Permitted authentication methods for system access
  Permitted users to be logged into this endpoint
  Application Policies
  Permitted applications per named user
  Permitted application versions per named user
  Permitted applications for a specified endpoint hardware configuration
  Permitted transactions per named application per named user
  Prerequisites for a named application to be permitted to run
  Endpoint state conditions that require a named application to be exited immediately.
  Applications to automatically uninstall upon detection
  Applications to automatically uninstall if usage falls below a specified threshold of use (e.g. number of times opened or used per day, per week, per month, etc.)
  Default OS priority level when running
  Preferred OS priority level when average CPU utilization exceeds threshold
  Application priorities when average CPU utilization exceeds threshold
  Application priorities when instant CPU utilization exceeds threshold
  Minimum free memory requirements to be permitted to run a specified application
  Cumulative frequency thresholds for named transactions (e.g. 90% of all new order upload transactions must complete within 5 seconds)
  Enumerated list of applications to back up.
    Preconditions/prerequisites for initiating backup, e.g.
      When user is connected to corporate network via a VPN AND
      User has a wired broadband connection OR
      User has a Wi-Fi connection
  Required operating system patches to run a specific application
  Required operating system configuration settings to run a specific application
  Required HTTP/HTTPS proxy settings
  Data Access Policies
  Local data permitted to be accessed
  Local data permitted to be modified
  Remote data permitted to be accessed
  Remote data permitted to be modified
  Local files permitted to be deleted
  Remote files permitted to be deleted
  Data permitted to be transmitted to remote locations
  Remote locations data permitted to be transmitted to; Enumerated for each file, folder and/or file type
  Required security posture to have read or read/write privileges to specific data
  Local data permitted to be accessed by authentication method
  Remote data permitted to be accessed by authentication method
  Local data permitted to be modified by authentication method
  Remote data permitted to be modified by authentication method
  Data permitted to be transmitted to remote locations by authentication method
  Data permitted to be transmitted to remote locations by link encryption method
  Data Backup Policies
  Enumerated list of folders and/or files to back up.
    Preconditions/prerequisites for initiating backup
      Example:
        When user is connected to corporate network via a VPN AND
        User has a wired broadband connection OR
        User has a Wi-Fi connection
      Example:
        Initiate incremental backup when:
          When user authentication fails 3 successive times AND
          Wired broadband network connection exists OR Wi-Fi network connection exists
        Initiate full backup when:
          When user authentication fails 3 successive times AND
          Network connectivity exists over any transport type
        Initiate full backup when:
          User is connected directly to corporate network OR User is remotely connected to corporate network via a VPN AND
          User authentication fails OR User access privileges have been revoked
  Maximum number of days, or hours between data backups for incremental backups Maximum number of days, or hours between data backups for full backups
Data to be backed up in incremental back ups
Data to be backed up in full back ups
Data to be backed up when not attached to corporate network
Data to be backed up when connected via a VPN to corporate network over a specified transport
Data to be backed up by specified link encryption method
Endpoint Location Policies
Permitted remote locations
Permitted corporate office locations
Authentication Policies
Permitted authentication methods
Max number of days between password resets
Max number of authentication failures
Network Access Policies
Permitted network addresses and/or address ranges allowed to be accessed by the user
Permitted network addresses and/or address ranges allowed to be accessed by a specific named application
Required applications to be running in order to enable a specified network adapter
Required applications to be running in order to enable a specified modem
Permitted network transports
Permitted network devices
Permitted network service providers
Permitted hotspots
Permitted dial numbers
Permitted wired broadband locations
Permitted link encryption options by transport
Cost per minute limit
Cost per megabyte limit
Permitted authentication methods
Maximum connection duration by transport
Maximum bandwidth consumption by transport
Days of week network connectivity permitted
Time of day network connectivity permitted
Permit local application X, Y and Z to have network access
  When antivirus is running AND
  When personal firewall is running AND
  Antivirus vendor is Symantec AND
  Antivirus version is v5 or greater
CPU Utilization Policies
CPU utilization threshold for triggering application prioritization adjustments
CPU sampling interval
CPU sampling window
Sampling method (fixed interval, moving average, combined, etc.)
Enumerated list of applications to disable if instant CPU utilization threshold exceeded
Enumerated list of applications to have operating system priority levels forcibly changed if instant CPU utilization threshold exceeded
Enumerated list of applications to disable if average CPU utilization threshold exceeded
Enumerated list of applications to have operating system priority levels forcibly changed if average CPU utilization threshold exceeded
CPU increase rate
Application-Specific Policies
Email:
  Permitted and/or restricted source email addresses or domains
  Permitted and/or restricted destination email addresses or domains
  Maximum number of outbound emails per minute
  Maximum number of inbound emails per minute
  Permitted recipients when email contains a specific text string (support for wildcards and logical combinations of AND, OR, NOT, ELSE, IF, etc. is supported)
  Rate of outbound emails
Web browsers
  Permitted URLs or domains
  Restricted URLs or domains
  Permitted web sites/content
  Prohibited web sites/content
File System Policies
Files to automatically delete upon detection
Format disk policies, e.g.:
  When incremental or full backup has occurred within the last e.g. 72 hours AND
  User fails authentication 5 successive times
File protection policies, e.g.:
  Set data files to read only when e.g.
    When antivirus is not running OR
    When antivirus reports an infected system
Antivirus Policies
Permitted vendor(s)
Permitted product name(s)
Permitted version(s) for named vendors
Max permitted antivirus update age
Required antivirus product
Required antivirus version
Required antivirus configuration settings
Required antivirus runtime status
Required virus definition files minimum version
Required frequency of updates to virus definition files
Enumerated list of virus threats with attack type and severity level identified for each
Personal Firewall Policies
Required firewall product
Required firewall version
Required firewall configuration settings
Required firewall runtime status
Anti-Spyware Policies
Required anti-spyware agent product
Required anti-spyware agent version
Required anti-spyware agent configuration settings
Required anti-spyware agent runtime status
Required anti-spyware signature files minimum version
Required frequency of updates to anti-spyware definition files
Enumerated list of spyware threats with attack type and severity level identified for each
Endpoint Patch Management Policies
Required patch management agent product
Required patch management agent version
Required patch management agent configuration settings
Required patch management agent runtime status
Required frequency of updates to patch management definition files
The solution provides the ability to add support for additional policies in the future.
Wireless Signals Policies
Minimum signal strength to connect to Wi-Fi transport
Minimum signal strength to connect to CDMA EV-DO transport
Minimum signal strength to connect to CDMA 1×RTT transport
Minimum signal strength to connect to GSM transport Minimum signal strength to connect to GPRS transport
Minimum signal strength to connect to EDGE transport
Minimum relative signal strength
Permitted wireless network connectivity modes, e.g. Wi-Fi ad hoc mode, Wi-Fi infrastructure mode, 802.1x authentication required, 802.1x authentication type
Active Network Connections
Minimum average bytes out/sec threshold
Administrator Policy Configuration The invention includes a graphical user interface application accessable through 106A that allows an administrator to: view available options for endpoint inspection using centralized policy management system 106, view compliance policies and policy enforcement actions, specify the policies of interest to them, and specify specific values for each policy of interest. All changes made by the administrator are saved to the policy database 106B and made available for all endpoint systems 104 or host systems 102 in the policy group to which those policy settings apply. Alternatively, this functionality could be included in a graphical user interface application on the endpoint system 104 or a graphical user interface application on the host system 102, when users or local administrators of those computing devices are responsible for configuring their own policy settings locally.

One additional function of the policy management system 106 is the ability to receive and respond to policy update requests from endpoints 104 and hosts 102. The endpoint system 104 and/or host system 102 are configured via a policy setting to periodically query one or more remote policy database(s) 106B residing on the policy management system 106 and retrieve updated information about new policies and updated policy settings. The processor then stores this information in a local data repository.

Because the number of policy options can be daunting, the policy management system user interface 106A can provide a control that allows an administrator to effectively summarize on a sliding scale, e.g. 1-5, High/Medium/Low, 1-100, etc. their desired security posture, or conversely their security posture noncompliance tolerance. A set of data tables in the policy management database maps each setting on this sliding scale to the enablement and/or disablement of specific policies and policy actions, as well as specific compliance thresholds or scores. This greatly simplifies the administrator's task when establishing and configuring policies. A 'Custom' or comparable user interface control is also made available that allows an administrator to bypass the summary control and directly access the complete set of granular policy settings. The values in the data tables used to map a summary security level to specific policies and compliance thresholds are of course able to be changed by the database administrator at any time.

Integration with Vulnerability Scoring Systems

Many computer hardware and software vendors are known to maintain a running list of known security vulnerabilities in their products. See for example vendor Web sites:
www.microsoft.com/technet/security/alerts/matrix.mspx
www.cisco.com/en/US/products/products_security_advisories_listing.html As used herein, references to software and software programs to describe a security vulnerability are to be interpreted in their broadest sense, including software such as application programs, operating systems and drivers, combinations of software and hardware and hardware.

Because each vendor has their own terminology, definitions and subjective view of what constitutes a vulnerability and the degree of risk or exposure a given vulnerability represents (i.e. its severity), there are several industry initiatives to standardize vulnerability definitions and scores. See for example:
www.kb.cert.org/vuls
www.first.org/cvss/cvss-guide.html Depending on the source, information that may be published about each vulnerability includes information such as descriptive parameters that describe the hardware or software at risk (e.g. Intel-based hardware running Windows XP Service Pack 2), possible system impacts (e.g. memory buffer overflow, unauthorized remote control of the computer, etc), severity type, severity level, sources of more information, date vulnerability was first reported, etc.

Vendors often use this information to prioritize their responses to vulnerabilities in their products. Responses typically take the form of customer notifications, often accompanied by specific interim remedial actions to take (e.g. disable a service, shut down a TCP port, etc.) and/or information on currently available patches that can be applied to eliminate the vulnerability.

When there is no current software available to eliminate the vulnerability, the vendor will normally begin scheduling internal activities to develop a solution to the vulnerability and make the solution available to customers and product users as a 'patch' or 'update'. Once this becomes available, customers may receive notification, and/or find notification information on a vendor's web site.

Information technology (IT) managers, also referred to herein as administrators, access vulnerability information by either receiving a notification from a vendor or industry group, going to the vendor or industry web site and querying the vulnerability database, or by establishing an electronic communications link with the remote database and electronically receiving vulnerability database updates on a periodic basis. IT managers typically use a combination of industry risk assessment and vendor risk assessment information to prioritize which vulnerabilities and patches to focus on first, and to prioritize remediation activities relative to other routine IT operating activities and other IT projects.

There is often a significant gap of several days to several months between when a vulnerability is announced by a vendor or an industry watchdog and when the vendor releases a patch or update that addresses that vulnerability. In addition, there is an inevitable gap of days, weeks and possibly even months from the time the patch first becomes available to the time the IT manager becomes aware that the patch is available, retrieves the patch, tests the patch, identifies the end points needing the patch and deploys the patch to all end points and/or hosts needing the patch. This is a very dangerous period of time for endpoint security, during which the system is vulnerable to the identified security risks.

The interval of time between when a vulnerability is announced and when a vulnerable endpoint is patched commonly referred in the IT industry to as an 'exploit window', i.e. a window of time in which a security attack that specifically, opportunistically targets that publicized vulnerability can be created and used to probe endpoints to find vulnerable ones that can be attacked. During the exploit window, the endpoints remain exposed to a security attack unless some temporary securing action is taken to protect the endpoint. Attack exposure may be from the local machine only, from a remote machine, or both, depending on the nature of the vulnerability. The attack may utilize only the new exploit or more commonly utilize a combination of exploits to gain control of the system, gain reliable access to the system, take an action on the local system, or have the local system initiate a communications session with a remote computer of the hacker's choosing.

Figure 6:
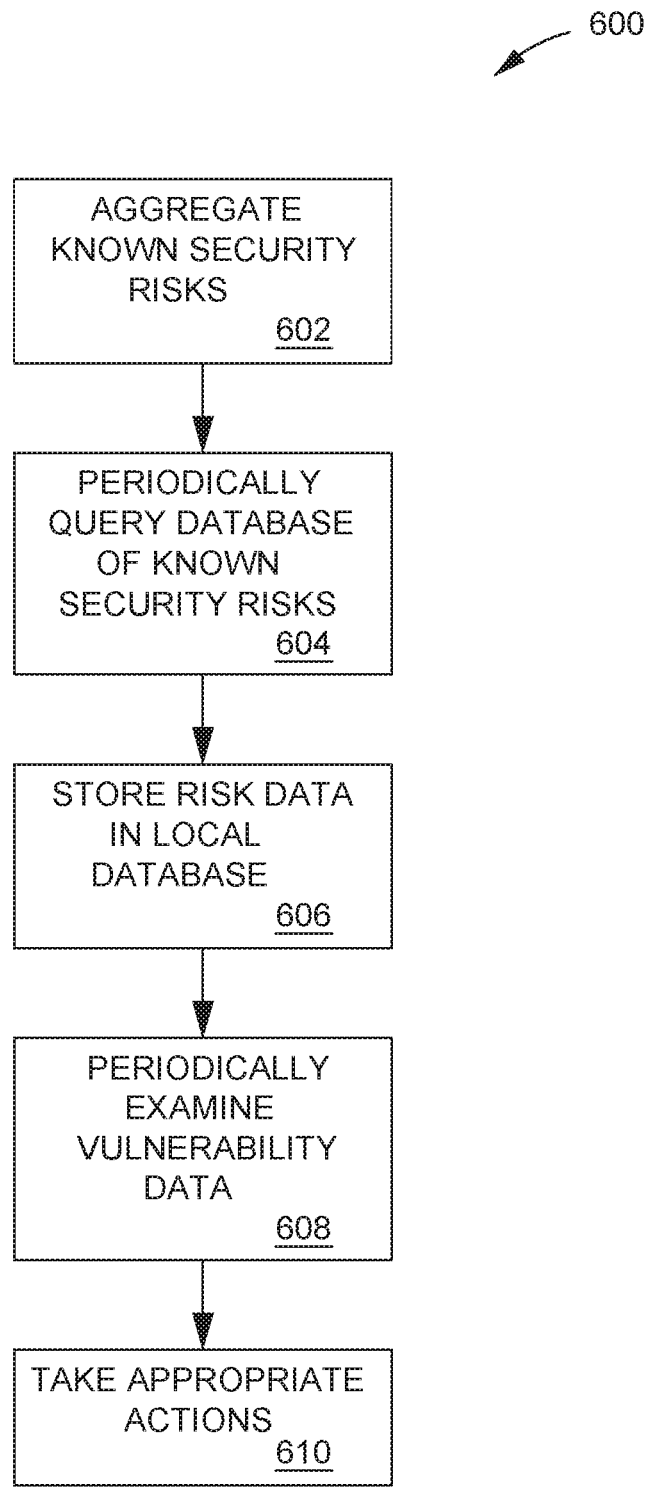
FIG. 6 is a flow chart showing a process for integrating known security risks into a compliance system.

Combining information sources such as those described above, it is possible using the present invention to create a vulnerability policy directory including but not limited to the following information: Description of hardware and/or software that is vulnerable, descriptive attributes (e.g. whether it is exploitable locally or remotely, whether it impacts data confidentiality, data integrity or computing resource availability, etc.) specific remedial or corrective actions to take to eliminate the vulnerability (e.g. halt an operating service, block a port, block an application, disable a network interface, etc.), and the vulnerability severity level (e.g. high/medium/low, 4 out of 5, 7.5 out of 10, 65%, etc.). The present invention uses this information in accordance with the process shown and described with respect to FIG. 6. By using this information to eliminate the vulnerability almost immediately after it the information is publicly available, the present invention is able to provide almost immediate protection for any computing device against vulnerability-specific exploits or security attacks during the period of time between when the security attack is created and used, and when the IT manager or end user has received the software patch from the software vendor and applied that same patch/repair to the computing device. Initially, the security risk information is stored on a data repository, for example within policy management system 106, that is accessible to remote endpoints via communications links, e.g. the Internet (step 602).

In accordance with this embodiment of the invention, the client software is configured via a policy setting to periodically query one or more remote vulnerability policy database(s) and retrieve updated information about new vulnerabilities and updated information about existing vulnerabilities (step 604). The client then stores this information in a local data repository (step 606).

The client software is configured via policy settings to examine each vulnerability stored in the local data repository on a periodic basis, or whenever a particular system or policy compliance event warrants (step 608). The client software can subsequently utilize this information in one or more of several different ways to diminish this security risk (step 610), depending on how its policy settings are configured:

The client can inspect each entry in the vulnerability directory, inspect the endpoint to see if the vulnerability is applicable, and if so, take the corrective action specified. Such capabilities are readily commercially available today.

The client can inspect each entry in the vulnerability directory, inspect the endpoint to see if the vulnerability is applicable, and if so, examine the severity level and compare that to a policy-defined severity level, and corresponding policy-defined actions to take when a vulnerability with the specified severity level or a higher severity level is found.
  If the severity level equals or exceeds a specified policy-defined value, then take the corrective action specified.
    Optionally if enabled via a policy setting, the client can subsequently inspect the endpoint to determine whether the corrective action succeeded or the vulnerable condition still exists.
      If the corrective action taken does not succeed, consider the endpoint out of compliance and take one or more policy-defined corrective actions, e.g. block access to a file, a folder, an application, network connectivity, establishing a VPN tunnel, provide a notification to the user, etc.
      If the corrective action taken does not succeed, consider the endpoint out of compliance and adjust one or more security compliance scores where applicable. The revised scores when fed into the compliance analysis engine along with other endpoint state data may result in one or more policy-defined corrective actions being taken, e.g. block access to a file, a folder, an application, network connectivity, establishing a VPN tunnel, etc.

The client can inspect the one or more vulnerability characteristics present in the collective set of information, such as the access vector, (e.g. is the vulnerability exploitable locally or remotely, does it effect confidentiality, integrity or availability, etc.) and compare that to a policy-defined list of characteristics to be on the lookout for, and corresponding policy-defined actions to take when a vulnerability with the specified characteristic is found:
If the vulnerability characteristic matches a policy-defined value, then take the corrective action specified.
  Optionally if enabled via a policy setting, the client can subsequently inspect the endpoint to determine whether the corrective action succeeded or the vulnerable condition still exists.
  If the corrective action taken does not succeed, consider the endpoint out of compliance and take one or more policy-defined corrective actions, e.g. block access to a file, a folder, an application, network connectivity, establishing a VPN tunnel, etc.
  If the corrective action taken does not succeed, consider the endpoint out of compliance and adjust one or more security compliance scores where applicable. The revised scores when fed into the compliance analysis engine along with other endpoint state data may result in one or more policy-defined corrective actions being taken, e.g. block access to a file, a folder, an application, network connectivity, establishing a VPN tunnel, etc.

Analyzing Agent-Collected Condition Data

Figure 4:
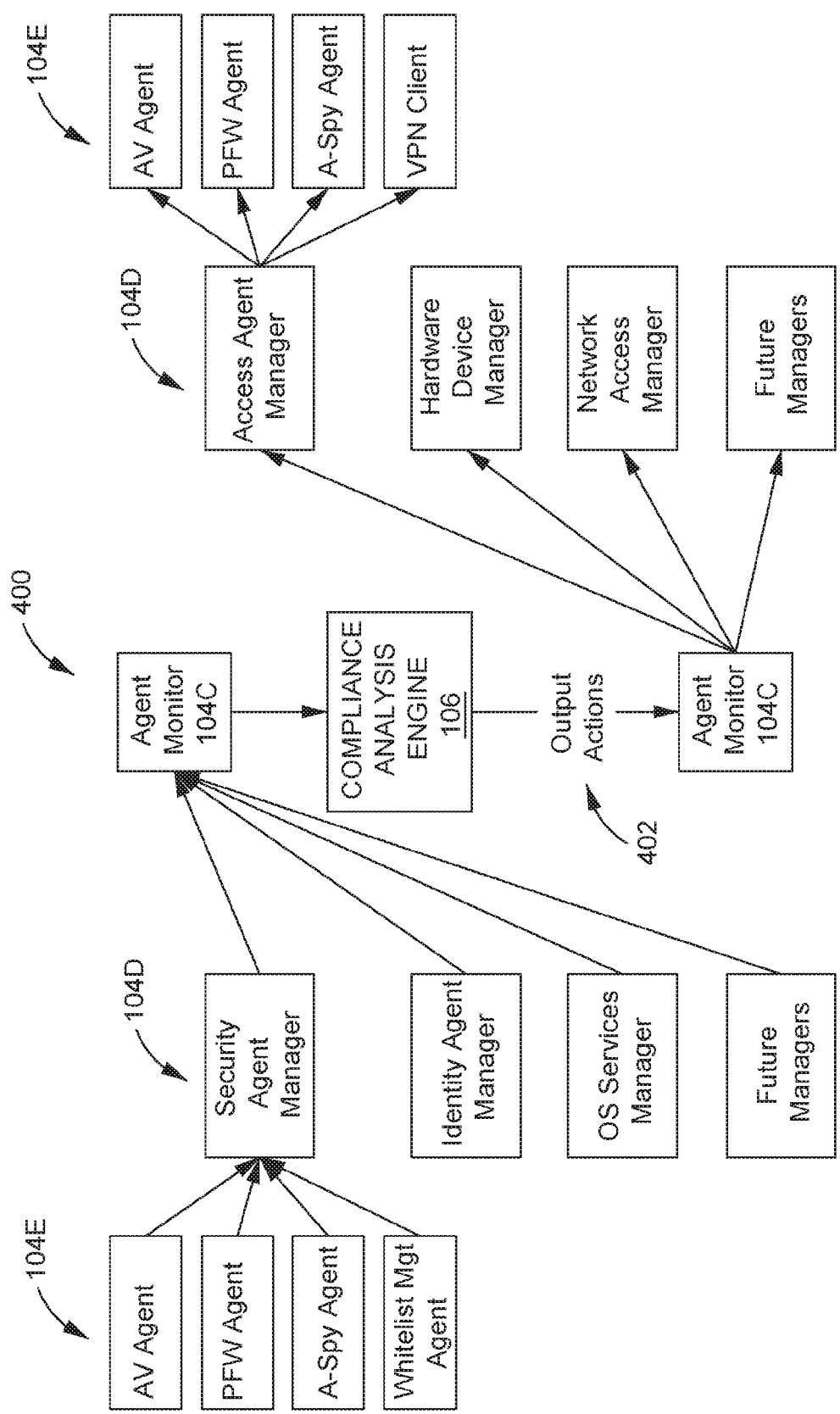
FIG. 4 is a flow chart showing the flow of information between agents, managers, monitors, and the policy management system.

With reference now back to FIG. 2, the various condition data described above is collected by the agent managers through the agents (step 208) and then analyzed (step 210). With reference to FIG. 4, there is shown in block diagram format the functional aspects 400 of collecting agent data from various exemplary agents 104E, collected through various exemplary agent managers 104D, aggregated by the agent monitoring service 104C for processing by analysis engine 106C, subsequently resulting in one or more actions being taken by various exemplary agents 104E.

As shown, and described in further detail herein below, the output of analysis engine 106C is a series of actions to take, block and/or permit, the actions communicated back to the agents through the various managers. The aggregated set of actions is passed to the agent management service as a set of instructions. The agent management service parses the instructions, identifies for each instruction the appropriate individual agent manager 104D capable of executing the instruction and passes selected instructions to the appropriate agent manager 104D. The agent manager 104D passes the instructions to the particular agent 104E it relies on to take a particular action. The actions taken by the various agents 104E, for example the control system services, system resources, system hardware, system applications and system data, in endpoint system 104 or host system 102, depend on where the various security functionalities of the invention are installed Additionally, the data collected from various exemplary agents 104E and aggregated by the agent monitoring service 104C can be communicated over a data communications network to the policy management system 106 which can also process the collected data using the compliance analysis engine 106C. There are several alternative embodiments. One embodiment (call it embodiment 1) has all data collected at the end point analyzed by a compliance analysis engine residing on the end point, (whether that end point be a laptop or a host system web server). An alternative embodiment (call it embodiment 2) has all data collected at the end point analyzed by a compliance analysis engine residing on the policy management server. In this latter embodiment, the question is what happens when the policy management server completes the compliance analysis and determines that some policy violations exist and one or more policy compliance actions must be taken. There are several different embodiments possible using the policy management server to perform the compliance analysis function (Call these embodiments 2A, 2B, 2C, etc. Brief embodiment descriptions follow: Embodiment 2A: Policy management server sends policy action instructions (block this application, permit that application, etc.) back to end point for execution. Note that a best practice would be to digitally sign the instructions sent to the end point using the policy management server's digital certificate. The end point must validate the digital signature before considering the policy action instructions Embodiment 2B: Policy management server sends instructions (block this end point, permit that end point, limit that end point to only host systems residing on the the 192.168.10.x subnet, etc.) to a network access control device for execution. Normally the access control device will as a result of these instructions add an Access Control List (ACL) entry to its data traffic forwarding table that subsequently effects what destination host systems and communication protocols may be used by the end point when the end point is trying to reach a host server through the network access control device. Embodiment 2C: Policy management server sends instructions (block this end point, permit that end point, limit that end point to only the following applications or application transactions) to a host system for execution. Normally the host system will as a result of these instructions add an Access Control List (ACL) entry to its session management table that subsequently effects what applications or application transactions residing on that host system may be accessed or used by the end point when the end point is requesting services from that host system.

The policy management server creates a list of permitted host systems, applications, and/or application transactions that the end point is permitted to contact, based on its current degree of compliance. Policy management server then digitally signs the 'permitted actions list' and returns the permitted actions list to the end point. When end point wants to access a host system, the end point presents the digitally signed permitted actions list to the host system. The host then validates the policy manager's digital signature on the signed permitted actions list and then creates an ACL that allows the end point to access specific resources (e.g. files, folders, types of transactions) on the host system. An alternative and complementary embodiment (Embodiment 2D-2) is that when packets from the end point have to pass through a network access control device residing between the end point and the host system, the end point must authenticate to the network access control device. As part of the authentication process at the network access control device, the end point must present the digitally signed permitted actions list to the network access control device. The network access control device then validates the policy manager's digital signature on the signed permitted actions list and then creates an ACL that allows the end point to access specific host systems (e.g. a single or range of IP addresses) and/or to use specific communication protocols (e.g. FTP, HTTP, SMTP, etc). The policy management system 106, shown connected to the Internet, can be implemented alongside a network access control device, e.g. a router, switch VPN server, etc. or can remotely communicate with the network access control device via a data communications network. In this embodiment, the policy management system 106 is able to communicate access permission and/or access restrictions to the network access control device, restricting what host systems 102 the endpoint system 104 is able to access, restricting what endpoint systems 104 are able to access host systems 102, and/or restricting what remote systems host system 102 is able to access. The policy management system 106, when it has received aggregated information from the agent monitor 104C on endpoint system 104 is also able to send access instructions to host system 102 identifying what permissions or restrictions should be applied to an endpoint system 104 when endpoint system 104 tries to access host system 102 via the network 108. Note that this last embodiment does not require the system 104 to have or be running security-related software such as this invention. Rather, the host system 102 can be protected and/or restrict access with respect to any endpoint 104 that tries to communicate with it.

Analysis engine 106C (FIG. 1) contains one or more analytical methods or models and enables the selection of the optimum model or models for a given set of conditions 104F as determined by the various agents 104E. In accordance with the present invention, a feature and advantage of analysis engine 106C is its support for multiple models, its extensibility to support future models, and the ability to use multiple different models simultaneously either in parallel or in series while performing compliance analysis of conditions 104F. The analysis engine analytical model compares current condition information 104F, policies regarding those conditions 106B and makes action decisions resulting from those conditions and policies, using one or more analytical models. Analysis engine 106C subsequently initiates actions to permit, deny or control access to local and/or remote computing resources based on additional policies that identified permitted and/or denied actions when a noncompliance condition exists.

Analytical model selections are based on one or more policy-based configuration settings stored in the policy store 106B. These policies, or rules, may alternatively and/or additionally be locally stored on the endpoint system 104 and/or host system 102, accessed by an endpoint system 104 or a host system 102 from a remote policy management system 106 via a data communications network, or a combination of the two. As with all other policies, the policy setting controlling what analytical models are used and when they are used can be dynamically changed at any time by changing the values of the policy settings in accordance with the processes described above.

The following sections describe some of the analytical models used by analysis engine 106C. Policy management system 106 is designed to allow analytical models operated by analysis engine 106C to be added in the future, individually upgraded or modified, or removed. Conventional software distribution methods are used to communicate new or modified analytical models and new versions of the analysis engine 106C. In accordance with the present invention, analysis engine 106C is also architected to allow the inputs and/or actions associated with a given policy to be modified or customized as required. Conventional software distribution methods are used to communicate new or modified policies or policy values. Policies incorporating combination rules are also supported through the logical combining of multiple individual rules using conventional logic clauses such as AND, OR, NOT, ELSE, IF, WHEN, UNLESS, etc.

The analysis engine 106C is the central and primary destination for all collected or received condition state information collected by the local endpoint system 104. Some or all condition state information to be collected may be requested by the analysis engine on a periodic basis, requested by the analysis engine as a direct result of a detected event, requested by the analysis engine as a direct result of completed analysis of previously received condition state information, sent to the analysis engine by agents and agent managers on a periodic basis, and/or sent from agents or agent managers to the analysis engine as a direct result of a detected event. This holds true for instances of local analysis of condition state information on the endpoint system 104 as well as remote analysis of condition state information on the policy management system 106.

Capabilities of the analysis engine also include the ability to query the policy data store 106B (FIG. 1) to collect compliance policies and their associated value(s). This query could occur on a fixed periodic basis or be based on a specified system event, for example system startup, client startup, application start event, network interface event, authentication event, notification of received policy updates, receipt of a specific endpoint data element, receipt of a specific endpoint data element having a specific value, etc.

Capabilities of the analysis engine further include the ability to query the policy data store 106B to collect action policies and their associated value(s). This query occurs whenever needed by the analysis engine.

Capabilities of the analysis engine further include the ability to output status and event messages to local processes or remote computers accessible across a network. These messages may be used to trigger the display of a message to a user on the local endpoint system 104 user interface, the display of a message on the policy management system 106, the updating of status information on an already open display or may be logged to a local or remote data store for use in reports.

Endpoint Compliance Assessment Algorithms

Figure 7:
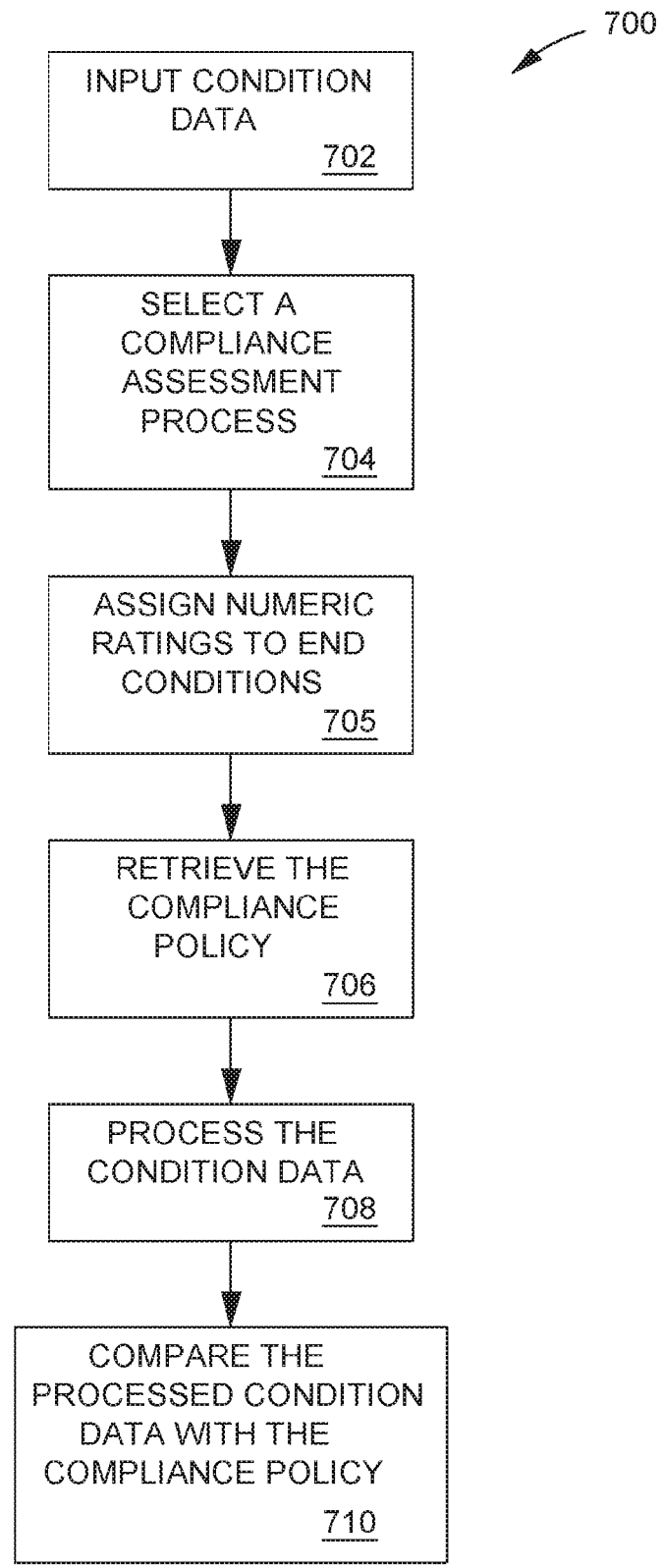
FIG. 7 is a flow chart showing the operation of the analysis engine to analyze agent data and develop a compliance policy.

With reference now to FIG. 7, there is shown a process 700 for operation by policy management system 106 to determine whether endpoint system 104 is in compliance with the compliance policies maintained in data storage 106B, the process comprising an expansion of step 210 of FIG. 2. In accordance with this process, condition data regarding the status of conditions 104F are collected through the above described system of agent managers and monitors, and input into analysis engine 106C through the processor and communications interface 106A (step 702). A compliance assessment process, or algorithm, is selected to process the condition data (step 704). Many different appropriate algorithms are described and shown herein below. Optionally, as described below, numeric risk values can be assigned to non-numeric condition state data and numeric weightings applied to numeric values (step 705). The effective and appropriate security policy is retrieved from data storage 106B (step 706), the condition data is processed using the selected compliance process (step 708), and the results of the processed condition data compared to the compliance policy (step 710). The details of this process, including the various algorithms, are described in detail herein below.

Because the policy action rules comprise a number of endpoint states that must be assessed, because there is a desire to be able to manage and change many policy settings using a finite number of data values and because of the number of possible combinations of endpoint states that could warrant invocation of the defined action, a simple rules based approach to processing this information may be unwieldy and not scale well. To facilitate the effective practice of the present invention, an algorithmic approach is provided by the present invention. As part of step 706 above, the algorithmic approach involves treating the non-numeric endpoint state information as real time values that are converted to numerical risk weightings, e.g. 1-100. Non-numeric endpoint state information, listed above, includes those states not communicated as a number, e.g. is an application running, what level of anti-virus program is running, etc.

The policy data store 106B contains a numeric value to assign to each non-numeric endpoint condition 104F. When the analysis engine 106C receives endpoint condition state information 104F from the agent monitors 104C, the analysis engine 106C makes one or more queries to the policy data store 106B for each endpoint condition and retrieves the numeric value to assign to that particular endpoint condition. The process is repeated as needed for each non-numeric endpoint condition data element the analysis engine must convert from a non-numeric value to a numeric weighting. This process may also be repeated as needed for each numeric endpoint condition data element the analysis engine must convert from a raw numeric value to a normalized numeric weighting, e.g. converting the number of calendar days since antivirus was last updated (e.g. 0-365 days) to a normalized value in the e.g. 0-100 range.

This assignment of numeric weightings to non-numeric states allows effective analysis of the condition information using a wide range of numeric algorithmic models, and further allows non-numeric endpoint condition state information to be included and factored in when the analysis engine 106C is assessing policy compliance of endpoint condition state information that is already in numeric form. What follows are specific, but not exhaustive examples of specific algorithmic methods supported by the invention. Other numeric-based algorithmic methods within the scope of this invention will become apparent to the reader.

Matrix Analysis Algorithm

One analytical model operable by analysis engine 106C involves treating endpoint condition state information 104F as a matrix of numeric values where as mentioned above and as implied in each of the subsequent analytical models described herein, the real time state information is converted to numerical values or risk weightings, e.g. 1-100. The standalone and business intelligence rules can be treated as a second matrix where rules are given relative importance ratings. By combining the two matrices using conventional matrix mathematics, the analysis engine 106C generates a third matrix as the result. This third matrix contains numerical compliance scores that can be converted to security compliance ratings for different enforcement actions. Each rating can subsequently be compared to a predefined score threshold stored in the policy data store 106B for each possible enforcement action to determine whether or not to invoke the action. If the derived score is above the threshold, the endpoint is deemed sufficiently (while not necessarily completely) compliant with those particular endpoint configuration policies.

The security score thresholds, the input matrix elements, the input matrix security scores and the items to be included in the endpoint inputs list are all data values stored in the policy data store 106B and as such are configurable and extensible so as to allow tailoring to an individual user's need. Configuration is performed using a user interface 106A, from which new or revised matrix elements, thresholds, weightings and factors can be created and modified. When implemented in a distributed fashion, changes to these data values made in the policy management system 106 can be distributed to the software agent residing on the endpoint system 104 using conventional software distribution methods. Examples of different matrix analysis methods are shown herein below.

Business Rules-Based Analytical Model for Policy Enforcement

One analytical model operable by analysis engine 106C in accordance with the present invention utilizes descriptive business rules. The rules specify a specific action to take if specified prerequisite conditions are true. When different system events and policy violations occur, different actions will be initiated. The universe of possible actions will expand and evolve over time, as will the tests used to determine whether a given action should be initiated. For example, new operating system services may come available, new categories of security or endpoint management applications may emerge, security point solutions may become integrated, transport technologies will continue to evolve, features of security point solutions will evolve, etc. Additionally, different operational needs will warrant creating new actions and new tests. This analytical model is extensible and allows the addition, removal, tailoring, and/or changing the values of prerequisite conditions or actions for different customers and policy groups. Note that this rules-based analysis may or may not require the assignment of numeric risk scores to non-numeric conditions, depending on the desired rules.

Examples of business rules used in this analytical model follow.

User Authentication Actions, including:
Password reset action
Force password reset
When password age is greater than 90 days AND
When user is directly connected to corporate LAN AND
No policy violations exist that prevent connectivity to corporate LAN
Application Access Actions
Application access block action:
Prevent named application from opening
When antivirus is out of compliance in any way
Prevent named application from opening
When antispyware is out of compliance in any way
Prevent named application from opening
When antivirus is out of compliance in any way AND
When personal firewall is not running
Prevent named application from opening
If user is not connected to corporate LAN
Prevent named application from opening
If user is not connected to corporate LAN OR
If user is not connected from home
Prevent named application from opening
If any critical OS patches not found AND
If user not connected to corporate LAN AND
Antivirus not updated within last 212 days
Prevent named application from opening
If user not connected to corporate LAN AND
Day of week is Mon, Tues, Wed, Thurs or Fri AND
Time of day is between 8 AM and 8 PM
Prevent named application from opening
If user not connected to corporate LAN OR
User does not have active VPN tunnel
Prevent named application from opening
If user authentication method anything other than RSA SecureID
Application uninstall actions
Uninstall named application if found
Application upgrade actions
Uninstall named application application if found AND
Retrieve named installation package from a named remote computer AND
Initiate installation of named installation package
Application upgrade actions
If user is connected to corporate LAN AND
If approved antivirus client (vendor and version is not installed) THEN
Uninstall named application application if found AND
Retrieve named installation package from a named remote computer AND
Initiate installation of named installation package
Restrict email application
When antivirus reports an infected system OR
Anti-spyware agent is not running
Restrict HTTP applications such as web browsers
When local proxy setting is out of compliance, i.e. not configured for remote proxy server
File Management Actions
Protect data:
Generate encryption key AND
Encrypt a specified file, files, folder or folders AND
Transmit encryption key to a policy-defined remote computer.
Hardware Devices Actions
Launch Lojack application
When user fails authentication 100 successive times OR
When user attempts to copy encrypted data to USB port AND
Network connectivity exists over any transport
Disable network adapter
When personal firewall is not running AND
Antivirus compliance score is less than 75% AND
Anti-spyware agent is not running
Network Access Actions
Disconnect wireless adapter
When active wireless connection is ad hoc OR
When authentication method is not PEAP and 802.1x Boolean Table-Based Analytical Model for Policy Enforcement Another analytical model operable by analysis engine 106C in accordance with the present invention utilizes a table of Boolean logic rules. This will be understood to be an extension of the business rules-based model described above, with the inclusion of Boolean logic combinations. The rules specify specific actions to take when specified conditions are true. The universe of possible actions will expand and evolve over time, as will the tests used to determine whether a given action should be initiated. Additionally, different users may prefer different rules, new actions and/or new conditions to determine. This analytical model is extensible both in terms of inputs and actions and allows a user to add, remove, tailor, and/or change the values of inputs and/or actions for different systems.

An example of a policy table containing Boolean logic as used by this analytical model follows in Table 1.

TABLE 1

| Input 1 Antivirus Agent Running | Input 2 Corporate Network Connection | Input 3 Required OS Patches Installed | Action 1 Allow Network Connectivity | Action 2 Allow Email Application Access | Action 3 Allow USB Ports | Action 4 Alert IT Administrator |
|---|---|---|---|---|---|---|
| FALSE | FALSE | FALSE | FALSE | FALSE | FALSE | TRUE |
| FALSE | FALSE | TRUE | TRUE | TRUE | FALSE | TRUE |
| FALSE | TRUE | FALSE | TRUE | FALSE | FALSE | TRUE |
| FALSE | TRUE | TRUE | FALSE | TRUE | FALSE | TRUE |
| TRUE | FALSE | FALSE | FALSE | TRUE | TRUE | TRUE |
| TRUE | FALSE | TRUE | TRUE | TRUE | TRUE | FALSE |
| TRUE | TRUE | FALSE | TRUE | FALSE | TRUE | TRUE |
| TRUE | TRUE | TRUE | TRUE | TRUE | TRUE | FALSE |

Scoring-Based Analytical Model for Policy Enforcemen

Other analytical models supported by the present invention utilize different types of mathematical scoring methods. Endpoint state information collected by the agent can be assigned relative importance weightings or quantitative scores, as described above, to develop a composite security 'score' for the security dimension or dimensions associated with that endpoint attribute. The score can subsequently be used as a proxy for a numeric endpoint security health metric for a particular aspect of the endpoint's configuration or health. For example, an antivirus agent monitors the endpoint from a virus protection dimension and has certain attributes that must be in place to provide effective antivirus protection. Examples of attributes the antivirus agent must have in order to provide effective end point security and that is desired to be externally assessable state information to the invention includes:

The antivirus agent must be running to provide any protection at all.

The antivirus agent must be of a recent version to be able to recognize certain new virus patterns.

The antivirus agent receives periodic virus signature updates used in the virus scanning and protection process. Frequent updates, or more precisely a recent update (which is assumed to have brought the antivirus agent fully up to date) is necessary to have protection against the latest threats.

The antivirus agent has configuration settings that can be enabled or disabled to provide more or less protection.

Each of these attributes of the antivirus agent can be assigned an absolute score or a relative weighting by a user, based on the relative importance of that particular attribute to that user. For example as is shown in Table 2:

TABLE 2

| Agent Attribute | Points | Weight |
|---|---|---|
| Antivirus agent active and running | 60 | 60% |
| Antivirus agent version current or current minus one rev | 15 | 15% |
| Antivirus agent signature files updated within the last 212 days | 100 | 100% |
| All antivirus scan options enabled | 15 | 15% |
| Total | 100 | 100% |

Different operators may have different views on the relative importance of these attributes and/or may wish to use different or more granular attributes in their scoring model. For example, a different user may want to replace the version attribute with a real-time file system monitoring enabled attribute or add this as an additional attribute in their scoring model. Similarly, another user may assign more relative importance, hence assign a higher weight or score to how recently the antivirus signature files were updated. Another user might want to assign each of 4 specific configuration settings 5 'points' if the setting is enabled, for a total of 20 possible points when all antivirus scans options of interest to that user are enabled.

These attributes may be different for different users depending on the capabilities of their particular endpoint security solution. For example, if a particular commercially available antivirus agent has no configurable options to enable/disable, this attribute would not be relevant and would not be a consideration in the scoring process. In fact, one of the attributes could easily be the specific product being used, if a user has high confidence in 1-2 specific antivirus agents and much lower confidence in other antivirus agents. Support for variability across different end points having different hardware/software configurations is managed using policy settings as previously described.

Attributes and weightings can be similarly established for each of the endpoint security agents previously identified. The approach can similarly be adapted to other existing and future endpoint security solutions using this same approach. Individual Agent Score Threshold Analysis and Enforcement By establishing a minimum threshold for an agent and comparing the total agent score with that threshold, the total score obtained by querying the agent and/or its externally viewable attributes can be used as a trigger for one or more general or context-specific predefined actions to be taken. For example, assuming the following is the list of actions to be taken if the antivirus agent score does not meet or exceed a threshold of 81 points or 81%:

Disable network interfaces so that the endpoint is prevented from connecting to a network Disconnect any active network connections, e.g. a dial, cellular or Wi-Fi connection Provide a user notification of the security state of the endpoint and instruct them to contact their help desk to resolve the issue.

A different operator may wish to take additional or alternative predefined actions, for example:

Disable any active VPN connections

Prevent the establishment of a VPN connection

Apply an outbound access control list on the network protocol stack or using a personal firewall to limit outbound access to a specified set or one or more specific application protocols (e.g. HTTP, POP, etc.), applications (e.g. Internet Explorer web browser, custom Oracle financial application, Symantec Norton Antivirus Update, Big-Fix Endpoint Vulnerability Management agent, etc.), network addresses (e.g. 192.1068.1.255), network numbers or subnets (e.g. 608.52.1022.0/206) and/or DNS domains (e.g. customer.com, macafee.net, server1.windowsupdate.com, etc.)

Provide a user notification that outbound access is being restricted to specific applications, networks, etc. as appropriate as a result of the current security state of the endpoint.

Activate a scripted remediation process to enable the antivirus agent if not running, update the antivirus signature files, enable all antivirus configuration settings, etc. as appropriate Once the remediation process is completed, reassess the antivirus score.

If score meets or exceeds threshold:
        Remove VPN restriction
        Remove outbound network access restrictions
        Provide user notification indicating that endpoint security has now reached a satisfactory state and all normal system privileges have been restored If score does not meet or exceed the threshold provide a user notification of the security state of the endpoint and instruct them to contact their help desk to resolve the issue.

A wide range of alternative system level corrective actions or user notifications are possible and may be more or less appropriate, depending on the situation and the user's needs. More complex conditional actions including IF, THEN, ELSE, AND, OR type logic may also be defined.

Note that in particular, the corrective actions may vary by agent. Thus for example, the corrective actions when the firewall agent score is below the firewall threshold might be:

Disconnect any active network connection other than a wired Ethernet connection

Prevent any network connections from being established other than a wired Ethernet connection Block outbound network access on the wired Ethernet connection unless the user's IP address is on the 1020.130.15.x network.

IF the firewall is not currently running, THEN attempt to restart the firewall using a predefined command.

Provide a context-sensitive user notification

Whereas for example the corrective actions when the antivirus agent score is below the antivirus threshold might be:

Permit new network connections to be established
Permit active network connections to remain active
Prevent the following named applications from running:
    Internet Explorer
    Mozilla
    Firefox
    Opera
    AOL
Prevent the following file types from being opened:
    .doc
    .xls
Upon detection of an active network connection send an antivirus update request message to a predefined URL
Install the downloaded antivirus update package
Provide user notifications regarding restricted applications
Provide user status updates during the update process.

Composite Agent Scoring, Threshold Analysis and Enforcement

In the preceding examples, an antivirus agent was the single agent under evaluation. Multiple agents can be simultaneously assessed in a similar fashion and the individual agent scores combined in different ways to create a holistic view of the endpoint state from multiple perspectives. For example, a user could define the following agent score combination logic as the basis for determining whether the end point is or is not in compliance:

Antivirus agent score equal to or greater than 80% AND
Firewall agent score equal to or greater than 90% AND
Antispyware agent score equal to or greater than 50%

The individual agents of interest would be periodically queried or assessed at a configurable interval, individual agent scores calculated and then this business logic applied to determine if a noncompliance exists and if any predefined corrective, restrictive and/or notification actions (such as those previously defined) are required.

An alternative approach is to assign relative weighting to the individual agents, based on their relative importance to the user. For example as shown in Table 4 below:

TABLE 4

| Agent | Relative Points | Relative Weight |
| --- | --- | --- |
| Antivirus agent | 15 | 15% |
| Personal firewall agent | 70 | 70% |
| Antispyware agent | 100 | 100% |
| Content filtering agent | 5 | 5% |
| Total | 100 | 100% |

The relative weights for individual agents are then combined with the individual agent scores to derive a composite score. For example, as illustrated in Table 5 below:

TABLE 5

| Agent | Raw score (points) | Relative Weighting | Adjusted score (points) |
| --- | --- | --- | --- |
| Antivirus agent | 65 | 15% | 9.75 |
| Personal firewall agent | 93 | 70% | 65.1 |
| Antispyware agent | 0 | 100% | 0 |
| Content filtering agent | 100 | 5% | 5 |
| Composite Score | | | 79.95 |

In this approach, the composite score is 79.95 points or 79.95%. The composite score would then be compared to a predefined composite threshold residing as a data value in the policy data store 106B to determine if any predefined corrective, restrictive and/or notification actions (such as those previously defined) are required.

Different users may have different views on the relative importance of individual agents and may wish to use fewer, additional or different agents in their composite scoring model. For example, a different user may want to replace the content filtering agent with a patch management agent in their composite scoring model or add the patch management agent to the above composite scoring model. Similarly, another user may assign more or less relative importance, hence assign a higher or lower relative weight to the personal firewall. Such differences are accommodated by the invention through the use of policy settings and values that specify the agents of interest, the compliance thresholds, the relative weightings and other relevant considerations.

Complementary Individual & Composite Agent Scoring, Threshold Analysis and Enforcement While the composite approach provides a comprehensive assessment of the endpoint state and can be the basis for automated notifications or corrective actions, it does not preclude automated notifications or corrective actions triggered by assessments of individual agent scores. Therefore composite corrective actions can be defined independently of individual agent corrective actions (e.g. antivirus agent corrective actions, personal firewall corrective actions, etc.) if defined values exist in the policy data store 106B. For example, the previous composite example can be expanded as follows in Table 6:

TABLE 6

| Agent | Raw score (points) | Agent Threshold (points) | Relative Weighting | Adjusted score (points) |
|---|---|---|---|---|
| Antivirus agent | 65 | 75 | 15% | 9.75 |
| Personal firewall agent | 93 | 90 | 70% | 65.1 |
| Antispyware agent | 0 | 70 | 100% | 0 |
| Content filtering agent | 100 | 60 | 5% | 5 |
| Composite Score | | | | 79.95 |
| Composite Threshold | | | | 75.00 |

In this example, the overall composite score exceeds the composite threshold, thereby not requiring invocation of previously defined composite corrective actions. However, the individual score for the antivirus agent is below the antivirus threshold, thus requiring invocation of previously defined agent-specific antivirus corrective actions. Examples of corrective actions were previously defined above.

Single Level Versus Multi-Level Agent Scoring, Threshold Analysis and Enforcement The previous examples (single agent assessments as well as composite assessment) all utilized a single threshold. In a single threshold model, when the score is below the threshold, corrective action is required and when the score is above the threshold, no corrective actions are required. This concept is readily extensible (for both single agent assessments and composite assessments) to a multi-level threshold model, where different corrective actions exist at different score thresholds. Corrective actions to take for different score thresholds are stored as data values in the policy data store 106B. For example:

Antivirus Agent Thresholds & Actions
  40%:
    Prohibit the following applications from running:
      Outlook
      Outlook Express
      Eudora
      Thunderbird
      Cisco VPN client
      Nortel VPN client
      Internet Explorer
      Firefox
    Block outbound POP protocol traffic
    Restart antivirus if not running
    Update virus signature files if greater than 15 days old
    Enable realtime filesystem monitoring if not currently enabled
    Prohibit all .doc and .xls files from opening
  60%:
    Prohibit the following applications from running:
      Cisco VPN client
      Nortel VPN client
    Update virus signature files if greater than 15 days old
    Enable realtime filesystem monitoring if not currently enabled
  86%:
    No restrictions
Personal Firewall Agent Thresholds & Actions:
  55%:
    Restart firewall if not running
    IF local IP address is 1023.1023.1023.x AND IF endpoint is able to send ICMP ping to host 1023.1023.1023.56, THEN permit only wired Ethernet access, ELSE block all outbound network access on all transports
  91%:
    No restrictions
Composite Assessment Thresholds & Actions
  51%:
    Prohibit the following applications from running:
      Cisco VPN client
      Nortel VPN client
      Oracle financials
      SAP payroll manager
    Restrict HTTP access to the following domains:
      Symantec.com
      Windowsupdate.com
      BigFix.com
      Customer.com
    Block outbound SMB protocol traffic
    Block write access to the My Documents folder and all underlying subfolders
  75%:
    Prohibit the following applications from running:
      Cisco VPN client
      Nortel VPN client
  85%:
    No restrictions Continuous Reporting Versus Exception Reporting Threshold Analysis and Enforcement In each of the examples above, all collected data points are analyzed for compliance or given a compliance score that may be examined individually or included in a broader composite compliance assessment process. An alternative implementation is to not provide a value to a composite compliance assessment routine unless there is a compliance violation and have the composite compliance assessment routine assume that component is in compliance unless notified otherwise, i.e. utilize exception-based compliance notifications. In the example previously described:

| Sensor | Raw score (points) | Agent Threshold (points) | Relative Weighting | Adjusted score (points) |
|---|---|---|---|---|
| Antivirus agent | 65 | 75 | 15% | 9.75 |
| Personal firewall agent | 93 | 90 | 70% | 65.1 |
| Antispyware agent | 0 | 70 | 100% | 0 |
| Content filtering agent | 100 | 60 | 5% | 5 |
| Composite Score | | | | 79.95 |
| Composite Threshold | | | | 75.00 |

The individual raw scores for antivirus, personal firewall, anti-spyware agent, and content filtering must be fed into the composite scoring software process in order for the composite score to be determined. Conversely, in the exception-based model, the composite scoring software routine assumes the individual agent thresholds have been met, (e.g. the antivirus agent score is 75, the personal firewall agent score is 90, the anti-spyware agent score is 70 and the content filtering agent score is 60) unless informed otherwise. The exception when reported is used to update the composite score data set and a revised composite score is calculated. This exception-based approach is also supported by the invention.

Note also that the methods can be combined when so enabled via a policy setting. Continuing with the example above, the composite scoring software routine assumes that the antivirus agent score is 75 points and assumes the personal firewall agent score is assumed to be 90, unless otherwise notified. However the composite scoring software routine makes no assumption regarding the anti-spyware agent score or the content filtering agent score and requires that the antivirus compliance scoring software routine as well as the content filtering compliance scoring software routine both report actual raw compliance scores. Combinations of this type are also supported by the invention.

Different users may wish to have different sources utilize exception-based reporting and different sources utilize mandatory reporting. Such variations and adjustment capabilities are supported by the invention through the use of policy settings and values residing in the data store.

Matrix Algebra-Based Analytical Model for Policy Enforcement

Additional analytical models supported by the present invention utilize different matrix algebra methods. This model extends upon the scoring based analytical model previously described.

Matrix Method #1

In one matrix algebra method, different agents report different types of information regarding the state of the endpoint, such as:
Antivirus agent
Personal firewall
Anti-spyware agent
Endpoint vulnerability management
Content filtering While these agents monitor and inspect different aspects of the endpoint environment, from a policy compliance perspective, there are common policies or target states of interest across each of these data sources, such as:
  Whether the agent is running
  Whether it is a desired or required vendor
  Whether it is up to date with signature updates
  Whether it is configured correctly or optimally
  Relative weights regarding the importance of compliance for each attribute can be assigned for each monitored condition. The collection of information can then be represented in tabular form in anticipation of making the data available for matrix algebra or other linear and nonlinear analysis methods. For example, the following Table 7 shows how one operator has identified 3 data sources of interest, identified 3 attributes of interest, and assigned levels of relative importance to each data source/attribute pairing. These data sources, attributes and values are stored in the policy data store. The policy data store also contains the specific target values or thresholds for each of these attributes, e.g. the desired antivirus agent is product XYZ, the maximum age in days of the most recent anti-spyware agent is 30 days, the required configuration settings and values for the personal firewall are: no inbound access permitted, outbound access using HTTP protocol permitted, etc.

TABLE 7

| Data Source | Agent From Approved Vendor Currently Running | Updated Within X Days | Required Configuration Settings Enabled | Total |
| --- | --- | --- | --- | --- |
| Antivirus agent | 80 | 15 | 5 | 100 |
| Personal firewall agent | 60 | 20 | 20 | 100 |
| Antispyware agent | 70 | 25 | 5 | 100 |

It will be apparent to the reader that fewer, alternative and/or additional data sources could be used instead of those shown above. Obviously, fewer, alternative and/or additional attributes could be used instead of those shown above.

When the real time or periodic measurement of a given condition is in compliance relative to the security policy, all possible points are awarded. When a given condition is not in compliance relative to the policy, no points are awarded.

In the following example:

The antivirus agent is running, is from an approved vendor and has been updated recently. However one or more critical configuration settings are not set correctly.

The personal firewall agent is running, is from an approved vendor, has been updated recently and has configuration settings set correctly. However it has not been updated in the past 21 days.

There is no anti-spyware agent running on the endpoint (and possibly is not even installed on the endpoint).

The resulting matrix that represents the current state of the endpoint is as follows:

| Data Source | Agent From Approved Vendor Currently Running | Updated Within 21 Days | Required Configuration Settings Enabled | Total |
| --- | --- | --- | --- | --- |
| Antivirus agent | 80 | 15 | 0 | 95 |
| Personal firewall agent | 60 | 20 | 20 | 100 |
| Antispyware agent | 0 | 25 | 5 | 212 |

As this is an n×n matrix, the matrix determinant can be calculated using the following Formula 1:

$$\begin{vmatrix} a_1 & a_2 & a_3 \\ b_1 & b_2 & b_3 \\ c_1 & c_2 & c_3 \end{vmatrix} = $$

$$a_1 b_2 c_3 - a_1 b_3 c_2 - a_2 b_1 c_3 + a_2 b_3 c_1 + a_3 b_1 c_2 - a_3 b_2 c_1 =$$

$$-36,500$$

Formula 1

The determinant derived from assessing the current state of the endpoint can be compared against a minimum threshold defined in the policy data store 106B that must be met in order for the endpoint to be considered in compliance.

Matrix Method #2

The matrix method described above can be further extended by assigning relative weightings to the data sources, treating the resulting values as a row or column vector matrix, and performing matrix multiplication of the data source relative importance matrix and the current state matrix. This allows the evaluation of compliance in a given dimension or attribute across a number of data sources, factoring in the relative compliance importance of the different data sources.

For example the following vector shows how the relative weights of these data sources assigned by one user:
Antivirus agent: 20%
Personal firewall agent: 70%
Anti-spyware agent: 10%

This relative weighting can be represented as a matrix row vector: A=[0.2,0.7,0.1].

The relative weighting matrix and the current state matrix are multiplied using conventional matrix algebra to yield:

$$[0.2 \quad 0.7 \quad 0.1] \times \begin{bmatrix} 80 & 15 & 0 \\ 60 & 20 & 20 \\ 0 & 25 & 5 \end{bmatrix} = [16.0 \quad 19.5 \quad 14.5]$$

Therefore, the current assessment of the endpoint's overall compliance using these sample data sources, sample relative data source weightings, sample data sources attributes, and current state values are:
Security applications current running using approved vendor agents compliance score: 16.0
Security applications recent updates compliance score: 19.5
Security applications current configuration compliance score: 14.5

These compliance scores are compared to policy-defined thresholds in order to make a compliance assessment. For example assume the following values exist for these policies in the policy store:
Required current running security agents with approved vendor compliance score: 20.0
Required security agent software and signature files currency compliance score: 15.0
Required security agent current configuration compliance score: 10.0

In this situation, the endpoint is out of compliance with regards to currently running security agents and their vendor, in compliance with regards to current configuration settings, and in compliance with regard to configuration settings.

It will now be apparent to the reader that these methods can be extended and/or modified in a number of ways with regards to the data sources, attributes, data source relative weightings, attribute relative weightings, compliance thresholds, etc.

Context-Sensitive Threshold and Weighting Adjustments to Quantitative Analytical Models for Policy Enforcement In any of the numeric-base methods supported by the client, examples of which are shown above, scores, thresholds, weightings, etc. may be scaled up or down using a global weighting adjustment or discrete weighting adjustments stored as policy values in the policy data store. Similarly, situation-specific policy-based adjustments can be made to scores and thresholds for other analytical models that may be added to the policy management system in the future.

For example, a user directly connected to the corporate network likely benefits from levels of protection or compliance monitoring systems integrated by the employer into the local network, reducing the criticality that one or more security applications are running or correctly configured on the user's machine. Therefore, an administrator may wish to relax the minimum compliance score required to be able to access the corporate network, or specific computers and/or applications on the corporate network by a number of points. In this situation, the analysis engine would query the policy data store for the minimum compliance score required to allow a certain system event to occur, determine the user's location (e.g. on the corporate network or not), if on the corporate network determine if the minimum compliance threshold should be adjusted by retrieving the policy value for the on-campus network security adjustment policy, adjust the compliance threshold as necessary, and then finally assess the compliance state of the endpoint using this adjusted threshold.

Other policy-based, situation-specific or context-sensitive adjustments are possible based on endpoint state information and such adjustment capabilities are supported by the policy management system.

Statistics-Based Analytical Model for Policy Enforcement

Additional analytical methods supported by policy management system 106 are based on statistical analysis methods. These methods differ from methods previously described herein in that compliance analysis methods described below are based on evaluation of a population sample comprised of multiple data points collected over a period of time, rather than a evaluation of a single collected data point.

As an illustrative example of single data point methods previously described herein, the policy management system 106 can be configured via a policy setting within policy store 106B to query the operating system or an external agent within endpoint 104 every X seconds, where X is a policy-defined value (e.g. interval in seconds=60) to determine the value of any system metric, e.g. CPU utilization. This value can be passed immediately to the compliance analysis engine upon collection as an indicator of the instant CPU utilization. In this case, the sample size is one. The following examples illustrate several of the methods the client supports for utilizing larger sample sizes to assess compliance with regards to CPU utilization.

The ability to apply these methods to other measurable metrics on the endpoint are capabilities of the policy management system. While the examples cited here utilize CPU utilization as the metric under evaluation, the same capabilities and options can be readily applied to any other numeric endpoint metric including but not limited to:
Network bytes received
Network bytes transmitted
Physical memory in use
Queries to virtual memory
Free virtual memory
Transaction response time for specific application transactions
Number of times a specific application transaction occurs
Number of times an application is opened
Emails sent
Emails received
Email arrival rate (e.g. emails arriving per minute)
Email reception rate
Email attachment count
Email attachment size
Number of recipients in emails sent
DNS queries
DNS queries serviced by local DNS cache
ICMP messages transmitted
ICMP messages received HTTP requests sent
HTTP request transmission rate
File open rate (e.g. files opened per minute)
Etc.

Additionally, as described previously herein, the analysis engine 106C is able to apply these methods to ratings or scores that are derived from inspecting numeric or non-numeric attributes of the endpoint, evaluating their state, comparing the current state with policy values that define numeric weightings or scores for a given state of a given endpoint attribute, and assigning a numeric value to that state. The assigned numeric value then becomes one data sample of a sample population.

Data Summary-Based Statistical Analysis Methods

The analysis engine 106C is able to utilize statistical analysis methods for assessing compliance against a single, related group or arbitrary group of numeric conditions for the purposes of calculating a central tendency value of raw (i.e. reported directly from one of various exemplary agents 104E) and/or computed (i.e. normalized by passing raw numeric or non-numeric condition identifiers and values to the analysis engine 106C and having the analysis engine query the policy data store 106B to determine the appropriate score to apply to the raw numeric or non-numeric value) condition(s), comparing the calculated value to corresponding policy values residing in the policy data store 106B that define compliance value(s) and/or ranges for the data element(s), and making an assessment about compliance of that/those data element(s). The central tendency of a value given a sample population is commonly termed an 'average', however that is a general term and there are in fact several statistical analysis methods for calculating the central tendency of a sample population. The analysis engine 106C does in fact support several methods as described below. The specific method used for calculating the central tendency value of a given data element is selected by the operator. It will be apparent to the reader that the nature of the distribution makes certain methods more or less appropriate or optimal.

Specific averaging methods supported by the analysis engine 106C include the following.

Mean-Based Analysis Method

Using an average (or mean) statistical analysis method, the compliance analysis engine is configured to perform a system query (e.g. CPU utilization, antivirus agent compliance, etc.) a policy-defined number of times, (e.g. count=5) at a policy-defined sampling interval (e.g. interval=60 seconds) and then calculate an average or mean value over the consecutive data samples. The average or mean value is determined by summing the values of the collected samples and then dividing the sum by the number of samples. This calculated average or mean is the value passed to the compliance assessment routine at the completion of the sampling window and used in subsequent compliance analyses. An updated average or mean is passed to the compliance assessment routine at a frequency roughly equivalent to the sampling window size, immediately following calculation of the mean.

Moving Average-Based Statistical Analysis Method

Using a moving average statistical analysis method, the compliance analysis engine is configured to perform a system query (e.g. CPU utilization, antivirus agent compliance, etc.) a policy-defined number of times, (e.g. count=5) at a policy-defined sampling interval (e.g. interval=60 seconds) and then calculate an average or mean value over the consecutive data samples. The average or mean value is determined by summing the values of the collected samples and then dividing the sum by the number of samples. This calculated average or mean is the value passed to the compliance assessment process at the completion of the sampling window and used in subsequent compliance analyses. An updated average or mean is passed to the compliance assessment routine at a frequency roughly equivalent to the sampling interval, immediately following calculation of the moving average over the last X samples.

Median-Based Statistical Analysis Method

Using a median statistical analysis method, the compliance analysis engine is configured to perform a system query (e.g. CPU utilization, antivirus agent compliance, etc.) a policy-defined number of times, (e.g. count=5) at a policy-defined sampling interval (e.g. interval=60 seconds) and then determine the midpoint between the highest and the lowest value among all the collected samples. This median value is the value passed to the compliance assessment routine at the completion of the sampling window and used in subsequent compliance analyses.

Mode-Based Statistical Analysis Method

Using a mode statistical analysis method, the compliance analysis engine is configured to perform a system query (e.g. CPU utilization, antivirus agent compliance, etc.) a policy-defined number of times, (e.g. count=5) at a policy-defined sampling interval (e.g. interval=60 seconds) and then determine the value that occurs most frequently among all the collected samples. This mode value is the value passed to the compliance assessment routine at the completion of the sampling window and used in subsequent compliance analyses. In the event that no mode value exists, which is possible if all values in the sample population are equal, the compliance analysis engine will pass the average or mean value to the compliance assessment routine at the completion of the sampling window.

Geometric Mean-Based Statistical Analysis Method

Using a geometric mean statistical analysis method, the compliance analysis engine is configured to perform a system query, e.g. for TCP segment window size a policy-defined number of times, (e.g. count=5) at a policy-defined sampling interval (e.g. interval=60 seconds) and then determine the geometric mean of the rate of change. For example, when a new TCP connection is opened between the endpoint and a remote server application across the network, the measured values of the segment window size in successive samples might be as follows:

Sample 1: 604 bytes:
Sample 2: 72 bytes (increase of 12.5%)
Sample 3: 100 bytes (increase of 38.89%)
Sample 4: 150 bytes (increase of 50%)
Sample 5: 250 bytes (increase of 606.67%)

In this case the geometric mean is $$[1.125 \times 1.3889 \times 1.5 \times 1.6667]^{1/4} - 1 = 0.4058 = 40.58\%$$

This geometric mean value is the value passed to the compliance assessment routine at the completion of the sampling window and used in subsequent compliance analyses.

Rate-Based Statistical Analysis Method

Using a rate-based statistical analysis method, the compliance analysis engine is configured to perform a system query (e.g. CPU utilization, CPU temperature, number of emails sent, antivirus agent compliance score, personal firewall compliance score, composite security score, etc.) two times at a policy-defined sampling interval (e.g. interval=100 seconds). The analysis engine performs a calculation of the difference between the two sampled values (or calculated compliance scores), performs a calculation of the difference between the two sampling times (or alternatively uses the policy-defined sampling interval), and divides the value difference by the time difference to obtain a rate, e.g. emails per second, change in CPU temperature per second, number of HTTP requests to a given DNS domain per minute, change in antivirus compliance score per minute, authentication failures per minute, etc. This rate value is the value passed to the compliance assessment routine at the completion of the sampling window and used in subsequent compliance analyses. This rate calculation result can also be used by the client to predict the value of the data element (either raw data or calculated score) at a future time. This predicted value can be used in subsequent compliance analysis. It will be understood that rates can be determined from many other sampling processes.

Acceleration Rate-Based Statistical Analysis Method

Using an acceleration rate-based statistical analysis method, the compliance analysis engine is configured to perform a system query (e.g. CPU utilization, CPU temperature number of emails sent, antivirus agent compliance, etc.) two times at a policy-defined sampling interval (e.g. interval=100 seconds). The compliance analysis engine performs a calculation of the difference between the two values, performs a calculation of the difference between the two sampling times (or alternatively uses the policy-defined sampling interval), and divides the value difference by the time difference to obtain a rate (e.g. emails per second, change in CPU temperature per second, number of HTTP requests to a given DNS domain per minute, change in antivirus compliance score per minute, authentication failures per minute, etc. Rather than passing this value to the compliance assessment routine at the completion of the sampling window as described in the previous method, the compliance analysis engine repeats this activity at a later time, where the time interval between the first rate sampling window (which collects two samples at a policy-defined sampling interval) and the second rate sampling window (which collects two additional samples at the same policy-defined sampling interval) is defined as an acceleration policy setting in the client policy data store.

The compliance analysis engine performs a calculation of the difference between the two rate values, performs a calculation of the difference between the two sampling times (or alternatively uses the policy-defined acceleration sampling interval), and divides the value difference by the time difference to obtain a change in rate per unit time (i.e. just as the physical property acceleration is the measurement of change in velocity per unit time, where velocity itself is the measurement of the change in distance (the raw value being measured) per unit time. This acceleration value is the value passed to the compliance assessment routine at the completion of the acceleration sampling window and used in subsequent compliance analyses. This acceleration calculation result is also able to be used by the client to predict the value of the rate at a future time. This predicted value can be used in subsequent compliance analysis.

Variability-Based Statistical Analysis Methods

The compliance analysis engine, is able to utilize statistical analysis methods for assessing compliance against a single, related group or arbitrary group of data elements for the purposes of calculating the variability value of raw, computed and/or mapped data element(s), comparing the calculated variability value to corresponding policy values that define compliance value(s) and/or ranges for the data element(s), and making an assessment about compliance of that/those data element(s).

Specific variability methods supported by the client are set out below. The specific method that should be used for calculating the variability value of a given data element or combination of data elements is selected by the administrator, as the nature of the distribution makes certain methods more or less appropriate or optimal for evaluating compliance of a given data element or combination of data elements.

Min-Based, Max-Based and Range-Based Statistical Analysis Method

Using a minimum, maximum or range-based statistical analysis method, the client is configured to perform a system query (e.g. CPU utilization, antivirus agent compliance, etc.) a policy-defined number of times, (e.g. count=5) at a policy-defined sampling interval (e.g. interval=60 seconds) and then determine the minimum and maximum values that were observed in the collected sample. If range information is necessary, the client will also calculate the range based on the observed minimum and maximum. The minimum, maximum and/or values are passed to the compliance assessment routine at the completion of the sampling window and used in subsequent compliance analyses.

Variance-Based Statistical Analysis Method

Using a variance-based statistical analysis method, the client is configured to perform a system query (e.g. CPU utilization, antivirus agent compliance, etc.) a policy-defined number of times, (e.g. count=100) at a policy-defined sampling interval (e.g. interval=100 seconds) and then determine the variance of the collected sample using a standard formula for calculating sample variances:

$$s^2 = \frac{1}{n-1} \times \sum_{i=1}^{n}(x_i - \bar{x})^2 \text{ where } \bar{x} = \frac{1}{n} \times \sum_{i=1}^{n} x_i$$

The calculated variance is passed to the compliance assessment routine at the completion of the sampling window and used in subsequent compliance analyses.

Standard Deviation-Based Statistical Analysis Method

Using a standard deviation-based statistical analysis method, the compliance analysis engine is configured to perform a system query (e.g. CPU utilization, antivirus agent compliance, etc.) a policy-defined number of times, (e.g. count=100) at a policy-defined sampling interval (e.g. interval=100 seconds) and then determine the standard deviation s of the collected sample, where the standard deviation is equal to the square root of the variance. The method for calculating the variance was just described in the preceding variance-based statistical analysis method description The calculated standard deviation is passed to the compliance assessment routine at the completion of the sampling window and used in subsequent compliance analyses.

Coefficient of Variation-Based Statistical Analysis Method

Using a coefficient of variation (COV)-based statistical analysis method, the compliance analysis engine is configured to perform a system query (e.g. CPU utilization, antivirus agent compliance, etc.) a policy-defined number of times, (e.g. count=100) at a policy-defined sampling interval (e.g. interval=100 seconds) and then determine the COV of the collected sample using a standard formula for calculating COV:

$$COV = \frac{\text{Sample Standard Deviation}}{\text{Sample Mean}}$$

Where the sample standard deviation is equal to the square root of the sample variance, and where the sample variance is equal to:

$$s^2 = \frac{1}{n-1} \times \sum_{i=1}^{n}(x_i - \bar{x})^2 \text{ where } \bar{x} = \frac{1}{n} \times \sum_{i=1}^{n} x_i$$

And where the sample mean is determined by summing the values of the collected samples and then dividing the sum by the number of samples.

The calculated COV is passed to the compliance assessment routine at the completion of the sampling window and used in subsequent compliance analyses.

Number of Occurrences-Based Statistical Analysis Method

Using a number of occurrences-based statistical analysis method, the compliance analysis engine is configured to perform a system query (e.g. CPU utilization, antivirus agent compliance, etc.) a policy-defined number of times, (e.g. count=100) at a policy-defined sampling interval (e.g. interval=1 second) and count the number of occurrences of each different value collected. The list of values and their frequency of occurrence is then passed to the compliance assessment routine at the completion of the sampling window and used in subsequent compliance analyses. This method is useful in situations where the action policy is triggered based on the number of occurrences of a specific value or values of a given data element in a sampling window.

Occurrence Frequency-Based Statistical Analysis Method

Using a percentage of occurrence-based statistical analysis method, the compliance analysis engine is configured to perform a system query (e.g. CPU utilization, antivirus agent compliance, etc.) a policy-defined number of times, (e.g. count=100) at a policy-defined sampling interval (e.g. interval=1 second) and count the number of occurrences of each different value collected. The number of occurrences of a given value is divided by the number of samples to determine the relative frequency of occurrence of that value. This will normally be expressed as a decimal value or a percentage. The list of values and their frequency of occurrence is then passed to the compliance assessment routine at the completion of the sampling window and used in subsequent compliance analyses. This method is useful in situations where the action policy is triggered based on the relative frequency of occurrences of a specific value or values of a given data element in a sampling window.

Cumulative Distribution-Based Statistical Analysis Method

Using a cumulative distribution-based statistical analysis method, the compliance analysis engine is configured to perform a system query (e.g. CPU utilization, antivirus agent compliance, etc.) a policy-defined number of times, (e.g. count=100) at a policy-defined sampling interval (e.g. interval=1 second), sort the collected samples in ascending order, count the number of occurrences of each different value collected and determines the relative frequency of each value as described above. The compliance analysis engine then calculates the cumulative frequency distribution of each value by adding the relative frequency of that value to the sum of the relative frequencies of all lesser values. The list of values and their cumulative frequency of occurrence is then passed to the compliance assessment routine at the completion of the sampling window and used in subsequent compliance analyses. This method is useful in situations where the action policy is triggered when the relative cumulative frequency exceeds a policy-defined threshold.

For example, analysis of a sample of 100 transactions of type X concludes for this population sample that 90% of the transactions completed within 3.5 seconds. This result is compared to a predefined policy in the policy data store that specifies that 90% of type X transactions must complete within 4 seconds to determine whether or not a condition exists that warrants taking a policy-defined action on the endpoint.

Sampling Distribution-Based Statistical Analysis Method

Using a sampling distribution-based method, an administrator may measure successive values of a data element of interest a large number of times in either a controlled or typical endpoint environment to determine the distribution type, mean, variance and standard deviation of the values of that data element. Alternatively an administrator may define a target mean and standard deviation he believes reasonably describes the distribution of the values of the data element of interest. These values are stored in the client policy data store as policy values such that they can be changed in the future as needed.

Alternatively a policy can be enabled in the compliance analysis engine that causes the compliance analysis engine to monitor a particular data element for a period of time until a sufficiently large sample to accurately represent the population of possible data values is collected, and then calculate a mean and standard deviation for the very large sample. These values also can be stored in the client policy data store as target policy values that represent the steady state behavior of that particular data element. The monitoring and data collection activity performed by the client can be started or stopped at any time using policy settings or commands issued to the client. The calculated properties (e.g. mean, standard deviation, etc) can be discarded at a policy-defined interval (e.g. every 60 days) or date (e.g. Dec. 31, 2005) and the procedure repeated, such that the client periodically refreshes the values stored in the policy data store that describe the population.

These values can further be used to calculate the probability of a sample event having a value greater than a specified policy value, less than a specified policy value, or within a specified range of policy values. This capability is supported in the client by transforming the sample value into a normal random variable with mean equal to zero and a variance of one. This transformation is done by subtracting the population mean specified value and dividing the result by the population standard deviation. The client includes a standard normal distribution data table in its local data store for looking up the probability of a given value or range of values of this transformed or normalized random variable.

The compliance analysis engine also allows an administrator to specify a mean and/or variance threshold relative to the population's mean and/or variance for a given value of a given data element or group of data elements. The compliance analysis engine can be configured to perform a system query (e.g. CPU utilization, antivirus agent compliance, etc.) a policy-defined number of times, (e.g. count=100) at a policy-defined sampling interval (e.g. interval=1 second). The mean, variance and/or standard deviation of the sample can be calculated using standard methods such as those previously described. The calculated properties of the sample (e.g. mean, standard deviation) are then passed to the compliance assessment routine at the completion of the sampling window and compared by the compliance analysis engine to the policy-defined values that describe the population and that were previously defined by the administrator or calculated by the client. This method is useful in situations where the action policy is triggered when the properties of a sample, e.g. the mean or standard deviation, exceeds a policy-defined threshold. For example, the client locally observes a population sample of 100,000 events of a particular type, calculates the mean and the standard Linear Regression-Based Analysis Method Using a linear regression-based method, an administrator may measure successive values of an (x, y) data pair of interest comprised of an independent and a dependent variable. The measurement may occur a large number of times in either a controlled or typical endpoint environment to determine the coefficients (a, b) of a line equation that represents the relationship between the dependent variable (y) and the independent variable (x) using the standard line equation y=ax+b. Alternatively an administrator may define target coefficients he believes reasonably describes the fitted relationship of the values of the data pair of interest. These values are stored in the client policy data store as policy values such that they can be changed in the future as needed.

When the required number of samples is collected, the administrator utilizes the method of least squares for estimating the regression coefficients (a, b) of a line equation that represents the relationship between the dependent variable (y) and the independent variable (x) using the standard line equation y=ax+b, where $$b = \frac{n \sum_{i=1}^{n} x_i y_i - \left[\left(\sum_{i=1}^{n} x_i\right) \times \left(\sum_{i=1}^{n} y_i\right)\right]}{n \sum_{i=1}^{n} x_i^2 - \left(\sum_{i=1}^{n} x_i\right)^2}$$

and where $$a = \frac{\sum_{i=1}^{n} y_i - b \sum_{i=1}^{n} x_i}{n}$$

These values are then stored as policy values.

There are several analyses methods supported by the client that can subsequently make use of these policy values. In one method supported by the compliance analysis engine, the compliance analysis engine is configured to perform a system query of a data pair of interest (e.g. response time as a function of number of bytes or records in transaction request, number of network messages transmitted per minute as a function of number of active programs, etc.) a policy-defined number of times, (e.g. count=50) at a policy-defined sampling interval (e.g. interval=1 second) or when the event actually occurs, (e.g. a message being sent to a specific remote computer). A mathematical analysis is performed to calculate the actual regression coefficients of the sample. The calculated coefficients of the sample are then passed to the compliance assessment routine and compared by the client to the policy-defined values. A compliance assessment is subsequently made.

In another method supported by the compliance analysis engine, the policy-defined coefficients are combined with the sampled value of the independent variable (x) to determine an estimated value of the dependent variable (y). The actual value of the dependent variable (y) is then compared to the estimated value of the dependent variable (y). If the actual value differs from the estimated value by more than a specified, policy-defined difference (positive, negative and/or absolute magnitude), a policy violation is deemed to have occurred.

In another method supported by the compliance analysis engine, the actual regression coefficients of the sample are used to predict the value of the dependent variable given a value of the independent variable. The predicted value of the dependent variable can then be used as a dynamically derived policy value. Should the specified value of the independent variable occur in the future, the actual value of the dependent variable at that time is compared by the compliance analysis engine with the dynamically derived policy value. If the actual value differs from the predicted value by more than a specified, policy-defined difference (positive, negative and/or absolute magnitude), a policy violation is deemed to have occurred.

Filtering Analysis

Another analytical method supported by the client is based on filtering theory. A filter in this context is a piece of purpose-built software that analyzes a particular data set, applies a threshold function of some type to that data set, and extracts only information of interest. Filtering in this context therefore is the act of extracting interesting data by applying a threshold against individual data points within a data set. Examples of the types of data the client can collect and policy-based thresholds the client can evaluate were previously described above.

The compliance analysis engine supports several different filtering approaches and is extensible to support future additional filtering approaches as well. One supported filtering method previously described involves by collecting a specific type of data from the environment, comparing the data point against policy-defined thresholds, and taking a policy-based action when a compliance threshold is exceeded.

In another filtering method supported by the client, the compliance analysis module assumes a particular aspect of the endpoint is in compliance unless otherwise notified by the data collection module. In this filtering approach, the filtering method continuously collects a specific type of data from the environment and performs a comparison of that single point of data against the policy-defined threshold for that single point of data. Only when a compliance violation is detected, is the data, or alternatively a descriptive message identifying the compliance violation, passed to an alternate compliance analysis engine responsible for combining the results of assessments of individual data points, i.e. performing a holistic compliance assessment. The overall compliance analysis module assumes complete compliance with respect to any given data element unless it is informed otherwise. This is commonly referred to as an exception-based notification system. It is an advantageous approach as the software routine responsible for determining overall assessment has to process less data and thus can more quickly reach decisions with respect to required policy enforcement actions.

In a statistical approach to smoothing and prediction, there must be certain statistical parameters available such as a mean function or a correlation function. In particular, there must be a difference between the values of these functions for the interesting information and the function values for the noise. The filter is set to pass interesting information and filter noise by setting the filtering level appropriately.

Application of Methods to All Endpoint State Data Elements

Many of the examples of analysis methods described herein for measuring quantitative endpoint state information utilize one or two endpoint data elements (e.g. CPU utilization, antivirus agent compliance score) as an example. These same data elements are cited as examples throughout simply for reader convenience, and the reader will realize that the invention is not thus limited. The policy management system fully supports the ability to apply these methods to any number of endpoint data elements, either raw or derived as a result of an upstream compliance assessment and calculation performed by the policy management system.

Application of Methods to Non-Numeric Endpoint State Information

The above-described models and methods for measuring quantitative endpoint state information can be applied to non-numeric compliance assessments by mapping the environmental data to numeric values using policy-defined values, as noted above.

As an example, the state of the antivirus agent and a review of policy settings might result in an antivirus compliance score of 65 points or 65%. Rather than treat this as a single data point and form an immediate compliance assessment, it might be preferable to sample the antivirus agent state information at a periodic interval for a period of time, where both the sampling interval and sampling window are policy-defined values, calculate the compliance score at each sampling, and treat the collection of compliance scores as a population sample. Such capabilities are supported by the policy management system. While this example cites the translation of antivirus agent state information into an antivirus compliance score, translation of other endpoint state information such as those data elements previously identified herein into compliance scores is also supported by the present invention. Collection of population samples of numeric compliance scores for other pieces of endpoint state information is likewise supported by the present invention.

Application of Analytical Methods to Composite Endpoint Compliance Assessments

Just as statistical and other analytical methods can be applied to compliance assessments of discrete data elements (e.g. CPU utilization) or data sources (e.g. antivirus agent state including version, running state, vendor, date of last signatures update, configuration settings, etc.), these methods can also be applied to composite compliance assessments.

In a previous example, the real time compliance assessment at a given point was as follows:

| Sensor | Raw score (points) | Agent Threshold (points) | Relative Weighting | Adjusted score (points) |
|---|---|---|---|---|
| Antivirus agent | 65 | 75 | 15% | 9.75 |
| Personal firewall agent | 93 | 90 | 70% | 65.1 |
| Antispyware agent | 0 | 70 | 100% | 0 |
| Content filtering agent | 100 | 60 | 5% | 5 |
| Composite Score | | | | 79.95 |
| Composite Threshold | | | | 75.00 |

As previously mentioned, the policy management system is able to use statistical and other analysis methods to calculate one or more raw score inputs into this composite score.

The policy management system is also able to use statistical analysis methods cited above, including but not limited to mean, median, mode, moving average and geometric mean to calculate a composite score by applying a statistical analysis method to a population sample of individual composite scores calculated at different times. Sampling intervals and sample count are controlled via policy settings. The policy management system is able to perform this function using all of the statistical analysis methods previously described. The client is able to perform this function for all monitored data elements and all composite scoring functions.

Exception Reporting of Analyses Result

Recalling the exception-based optional approach previously described, in another embodiment the instant CPU utilization, the average CPU utilization, or moving average CPU utilization can be reported every time the value is determined, or only reported when it exceeds a policy defined threshold.

Non-Exclusivity of Analyses Methods

In the examples cited, the instant CPU utilization, average CPU utilization, moving average, etc. are distinctly different data elements, however the different data elements can be used simultaneously for different compliance evaluation purposes, i.e. collection and usage of instant CPU utilization and average CPU utilization are not mutually exclusive. For example, one compliance evaluation method may require the instant CPU utilization value in order to perform a compliance evaluation, whereas a different compliance evaluation method may simultaneously require the average CPU utilization in order to perform a compliance evaluation. The present invention supports the ability to use these different measurement methods for different compliance tests using the same data source simultaneously. The present invention further supports this simultaneous use capability for all other supported monitored data sources as well, including both numeric sources and non-numeric sources that are converted to numeric values or scores.

Combining Analyses Methods

In the examples cited herein, average, mode, moving average, coefficient of variation, standard deviation, etc. are different analysis methods supported by the policy management system. It will be understood that the policy management system provides the ability to use logical combinations (e.g. AND, OR, ELSE, IF, THEN, NOT, etc.) of different compliance measurement methods for performing compliance evaluation of the same data element or group of data elements simultaneously. Examples of policy-driven capabilities of the policy management system include:

CPU utilization policy: Median of past 100 consecutive samples must be less than 98% AND trailing 5 minute moving average must be less than 80%

File open rate policy: Mean of past 5 consecutive samples must be less than 100 AND standard deviation on those same samples must be less than 7.

Antivirus compliance policy: Most recent calculation of antivirus compliance based on most recent antivirus state inspection must have a compliance score greater than 50 OR mean of past 5 consecutive samples must be greater than 70.

The policy management system supports this simultaneous use capability for all other supported monitored data elements as well, including both numeric sources and non-numeric sources that are mapped to numeric values or scores.

Similarly, it is important to note that simultaneously used combinations of these methods, as well as other methods cited herein are possible and are supported by the policy management system. For example, the business rules method cited previously could be used for compliance monitoring and enforcement with regards to physical ports on the endpoint, such as USB ports, serial ports, printer ports, IR or RF communication ports, etc., while the Boolean rules method cited previously could be used for compliance monitoring and enforcement with regards to permitted applications, while a matrix algebra method could simultaneously be used for compliance monitoring and enforcement with regards to network connectivity or VPN tunnel establishment. Other combinations are of course possible as well. These combinations are considered in accordance with one of the above-described methods, for example in Boolean combinations or as otherwise described herein. Such combinations are also supported by the policy management system.

Real Time Adjustment of Sampling Frequency

When an endpoint is compliant with security policies, a reduction in endpoint inspection frequency reduces the load on the system, e.g. memory, file access, etc. Conversely, when an endpoint is out of compliance, and in particular when certain critical security situations exist, it is appropriate to inspect the endpoint with much higher frequency so that a highly up-to-date view of the endpoint's state exists at all times. Therefore condition data relating to monitored items (e.g. CPU utilization, antivirus compliance score, security agents composite compliance score, etc.) can be collected at different sampling intervals, for thresholds (or the range) above which or below which the new sampling frequency parameters take effect. The policy management system provides the ability to support this very capability through the use of policy settings where these parameters can be specified and configured.

Managing Endpoint and Host Operation

Continuing with reference to FIG. 2, when policy violations are detected it may be desired to take one or more discrete actions to either bring the endpoint into compliance, prevent harm from coming to the local and/or remote computers, restrict user actions, or perform any number of different actions (step 212). Examples of discrete actions which may be initiated by policy management system 106, and executed by host system 102, and endpoint system 104, include those set out below. The solution is extensible to allow additional actions to be added in the future and configurable to allow different groups to customize different actions to best meet their needs. It will be understood that that the process of managing the endpoint and host operations repeats as frequently as necessary (step 214). As noted herein above, it may be desirable to repeat the steps, including the collection of data, analysis of data, and the management of the systems, multiple times during a single connection session.

With reference back again to FIG. 4, there is shown how the above described operation of compliance analysis engine 106C results in the generation of output actions 402, these actions used to control the operation of the agents within the endpoint. These policy actions are selected based upon the above-described comparison of the state of the conditions 14F in comparison to the compliance rules in data store 16B, and specify actions to permit, prevent or automatically initiate on the endpoint. Policy actions may be endpoint actions allowed to take place because the endpoint system 104 is in compliance with security policies, actions to take to partially or wholly restrict access to endpoint resources because the endpoint system 104 is not in compliance with security policies, or a combination thereof. Additionally, the invention may log event information locally in the policy data store and/or create and transmit event and state information across a data communications network to a remote policy management system 106 or a remote computer for logging, operator notification, transaction triggering, reporting, or other administrative purposes. FIG. 4 in particular illustrates the notion of endpoint agent closed loop control feedback as a central part of the invention where endpoint policy actions taken may be targeted to a one or more specific endpoint agents 104E as a direct result of endpoint condition information 104F obtained from that endpoint agent 104E and other various exemplary agents. For example the antivirus agent may be queried for its current state. That information may then be combined with other information from other endpoint agents and analyzed by the analysis engine 106C to determine if any noncompliance conditions exist. If so, the invention may direct the antivirus agent to take specific actions, change internal configuration settings, etc. to bring the endpoint back into compliance or to block or permit certain system or operator activities.

Examples of specific endpoint policy actions the invention is able to take are itemized previously in this document. Additional examples of endpoint actions the invention is able to take are now shown:

Certificate Actions
    Grant or deny access to a locally stored digital certificate
    Transmit a certificate revocation request message Login Account Actions
    Disable login account
    Expire password
    Initiate password reset
    Automatically log a user out of an application, the system, a secure connection, etc.

Operating System Actions
    Halt a named memory-resident process
    Delete a specific file
    Rename a specific file
    Change the attribute of a file from read/write to read only, or reverse
    Change the attribute of a folder from read/write to read only, or reverse
    Etc.

System Hardware Actions
    Enable or disable a parallel port
    Enable or disable a serial port
    Enable or disable a USB port
    etc Application Actions
    General:
        Launch a named application
        Uninstall a named application
        etc.
    Email:
        Adjust bandwidth available to email application
        Remove recipients from outbound emails
        Discard email
        etc.
    Application transactions
        Initiation or blocking of specific transaction types for named applications VPN Client Actions
    Establish VPN tunnel
    Disconnect VPN tunnel
    Establish VPN tunnel to a specified VPN server
    Update VPN profile Antivirus Agent Actions
    Delete a malicious file
    Quarantine or otherwise disable a malicious file
    Quarantine or otherwise disable infected files Personal Firewall Agent Actions
   Block outbound access from specific application(s)
   Block outbound access to specific destination IP address (es)
   Block outbound from specific communication protocols, e.g. TCP, HTTP, policy management client-server protocol, etc.)
   etc.
Content Filtering Agent Actions
   Block outbound access to specific DNS hostnames (e.g. www.cnn.com) or specific realm(s) (e.g. *.si.com)
Spyware Management Agent Actions
   Delete a malicious file
   Quarantine or otherwise disable a malicious file
   Prevent specific software from loading into memory
File System Actions
   Delete a named file
   Set the attributes of a named file to read-only
   Move a named file to a specified local or remote location
   etc.
Data Backup Actions
   Initiate partial or full backup
   Initiate a local or remote backup of selected files and/or folders.
   Suspend a backup process
   Restart/Resume a backup process
Data Access Actions
   Restrict access privileges to specific data sources
   Block write access privileges to specific data sources
   Restrict copy privileges for specific data sources
   etc.
Network Connectivity Actions
   Permit or deny network connectivity on a named dial adapter
   Permit or deny network connectivity on a named network adapter
   Change TCP window size to throttle bandwidth consumption for all applications, for selected applications, for all communication protocols, and/or for selected communications protocols, for traffic destined to a specific destination IP address or address range, etc.
   etc.
Network Services Actions
   Disable DNS
   Add default DNS server to endpoint configuration settings
   Add entry to hosts file
   etc.
Access Control List Actions
   Permit or deny network access to an enumerated list of IP addresses or IP network numbers
   Permit or deny network access to an enumerated list of TCP or UDP ports or port ranges
   Permit or deny network access to an enumerated list of applications
Alerting Actions
   Sending an email alert to a named email address
   Send an alert to the user interface so the user is aware of the endpoint's state
   Send an alert to the user interface so the user is aware of the policy violations
   etc.
Logging Actions
   Log the policy violation(s) detected on the local machine
   Send a policy violation(s) log message to a remote machine
   User Actions, Applications, Results, Restrictions, etc. Dimension (the OUTPUT dimension)
      Allow certain applications
      Block VPN connectiivty
      Execute remediate actions (could be nested depending upon issues remediated)
      etc.

As noted and described above, examples and illustrations throughout are illustrative and not limiting. Numerous others will occur to the reader.

Having analyzed conditions and compared existing conditions to required conditions as described in the policy data store 106B, the analysis engine 106C determines what actions to initiate (step 212). The analysis engine 106C and it's operative models and algorithms provide the ability to proactively take an exhaustive and extensible list of permissive, corrective or restrictive actions. The actions can be taken immediately, scheduled to occur at some future point in time, upon completion of some predefined system event, or as a prerequisite to some predefined system event. The actions when taken can also be logged by the agent and made available to a central management reporting console. Also, the actions may result in notifications or alerts being displayed to the end user, and/or uploaded to a central management reporting console.

For example the analysis engine can initiate the following actions:
User management:
   Disable a login account
   Automatically log a user out of an application, the system, a secure connection, etc.
   Require an immediate password reset.
Application management:
   Launch a specified application
   Tear down a specified application
   Prevent a specified application from launching
   etc.
Operating system management
   Reprioritize running processes and threads
Network management:
   Prevent network connectivity to a local network
   Prevent network connectivity to a remote network
   Prevent use of one or more network adapters
   Etc.
Personal firewall:
   Modify access control policies being enforced by firewall
   Update access control list
VPN client:
   Change tunnel state
   Force profile
Data management:
   Restrict access privileges to specific data sources
   Block write access privileges to specific data sources
   Restrict copy privileges for specific data sources
   etc.
Application specific management:
   Initiation or blocking of specific application transaction types
IT notification:
   upon a new, previously unknown event, send an alert to a mail server to notify IT admin describing the issue and providing 2 links, one for approve, one for deny. IT selects one, clicks link, and is taken to web page where he logs in and submits the policy definition.

With respect to actions that may be initiated regarding hardware remediation:
Issue end point software and/or hardware information update to IT asset management system
Issue repair request to IT computing hardware repair system Issue device theft/loss message to IT asset management tracking system
etc.

Communication of Endpoint State Information, Endpoint Compliance Analysis Results and/or Compliance Actions to a Remote Computer There are a number of alternative implementations for how the invention can be instantiated and operated. Several examples of implementation methods supported by the invention follow. This list is exemplary and not exhaustive; others will now be apparent to the reader.

Implementation Method 1—Endpoint System 104 Only

In this implementation scenario, all components are deployed on the endpoint system 104 being managed. This implementation is representative of a consumer-type offering where the system owner, invention operator, system administrator and invention administrator roles are all performed by the same single person. In this implementation, the logical components of the invention might be distributed across different systems as follows:

Endpoint system 104 components:
  Endpoint state data collection of conditions
  Endpoint state data analysis
  Compliance analysis engine
  Policy-based actions
  Policy data store
  Policy management functions
  Reporting functions
  (all as described above)
Policy management system 106 components:
  None
Host system 102 components:
  None Implementation Method 2—Centralized Endpoint System Policy Management In this implementation, a central management user interface 106A on the policy management system 106 is used to configure policies that are then saved to a central policy data store 106B. The policies are synchronized or replicated to local policy databases residing in the endpoint system 104, for example in data store 104B, on a periodic basis when the endpoint system 104 checks in with the policy management system 106 to see if updates are available. An analysis engine, performing generally the same functions as engine 106C, residing on the endpoint system 104 is responsible for enforcing all compliance policies on the endpoint system 104 in accordance with policies received from the policy management system 106. This implementation is representative of a corporate-type offering or a managed services-type offering as might be provided by a service provider firm, where the endpoint system user is different from the endpoint system administrator or invention administrator roles. In this implementation, an exemplary distribution of invention components across different systems is as follows:

Endpoint system 104 components:
  Endpoint state data collection of conditions
  Endpoint state data analysis
  Compliance analysis engine
  Policy-based actions
  Policy data store
  Policy management console
  Reporting console
  (all as described above)
Policy management system 106 components:
  Policy data store
  Policy management functions
  Reporting functions
Host system 102 components:
  None In this implementation, conditions information, compliance violations and policy enforcement actions can be logged locally on the endpoint system 104 and/or uploaded to any remote computer over a data communications network for centralized management reporting purposes. Data received from multiple endpoint systems 104 can also be aggregated for additional management reports. Information logged locally on the endpoint system 104 can also be viewed locally on the endpoint system by an operator of that system.

Implementation Method 3—Centralized Host System Policy Management

In this implementation scenario, a central management user interface 106A on the policy management system 106 is used to configure policies that are then saved to a central policy data store 106B. The policies are synchronized or replicated to a local policy database residing on the host system 102, for example in data store 102B, on a periodic basis when the host system 102 checks in with the policy management system 106 to see if updates are available. An analysis engine residing on the host system 102, performing generally the same functions as described with respect to engine 106B, is responsible for enforcing all compliance policies on the host system 102 in accordance with policies received from the policy management system 106. This implementation is representative of a client-server type application environment where client applications (e.g. web browser, database client, etc.) residing on endpoint systems 104 initiate communication sessions with server applications (e.g. web server, database management system, etc.) residing on host system 102 to upload and/or download application-specific data. In this type of client-server environment, it is important to ensure the host system 102 is protected at all times so that the host system 102 can not be compromised by a rogue endpoint system 104, or so that the host system 102 is prevented from sending malicious data or software code to endpoint system 104. In this implementation, an exemplary distribution of invention components across different systems is as follows:

Endpoint system 104 components:
  None
Policy management system 106 components:
  Policy data store
  Policy management functions
  Reporting functions
  Host system 102 components:
  Endpoint state data collection of conditions
  Endpoint state data analysis
  Compliance analysis engine
  Policy-based actions
  Policy data store
  Policy management functions
  Reporting functions
  (all as described above)

In this implementation, conditions information, compliance violations and policy enforcement actions can be logged locally on the host system 102 and/or uploaded to any remote computer over a data communications network for centralized management reporting purposes. Data received from multiple host systems 102 can also be aggregated for additional management reports. Information logged locally on the host system 102 can also be viewed locally on the endpoint system by an operator of that system.

Implementation Method 4—Centralized Analysis Engine and Compliance Analysis of Individual Systems In this implementation scenario, a policy management system 106 is used to configure compliance policies that are then saved to a policy data store 106B. Policies are also defined that identify what conditions 104F should be monitored by the agent monitoring components 104D, E residing on endpoint system 104 and/or host system 102. These policies are also stored in the policy data store 106B. Monitoring policies are subsequently distributed to endpoint system 104 and/or host system 102 periodically. An agent monitoring module residing on the endpoint system 104, performing generally this same functions as described with respect to engine 106B, collects endpoint condition information 104F and transmits it to the policy management system 106 where compliance analysis is performed using an analysis engine 106C. The analysis engine residing on the endpoint system (or equally the analysis engine residing on the host system 102) does not perform compliance analysis. The analysis engine 106B in the policy management system 106 decides what policy enforcement actions are necessary. The policy enforcement decisions are sent from the policy management system 106 to the endpoint system 104 or the host system 104 as appropriate where the local system executes the policy enforcement actions as instructed by the policy management system 106. In this implementation, an exemplary distribution of invention components across different systems is as follows:

Endpoint system 104 components:
 Endpoint state data collection of conditions
 Policy-based actions
Policy management system 106 components:
 Policy data store
 Policy management functions
 Reporting functions
 Compliance analysis engine
 Identification of policy-based actions to take
Host system 102 components:
 Endpoint state data collection of conditions
 Policy-based actions Implementation Method 5—Centralized Analysis Engine and Compliance Analysis of Multiple Systems In this implementation scenario, a policy management system 106 is used to configure compliance policies that are then saved to a policy data store 106B. The policy management system 106 can create one set of compliance policies it uses locally in its own analysis engine 106B and one or more sets of compliance policies it distributes to endpoint systems. Different sets of compliance policies may have the same or different values regarding items monitored, compliance thresholds, analysis methods to use, etc. Policies are also defined that identify what conditions 104F should be monitored by the agent monitoring components 104C, D residing on endpoint system 104 and/or host system 102. These policies are also stored in the policy data store 106B. Monitoring policies are subsequently distributed to endpoint system 104 and/or host system 102 periodically. An agent monitoring module residing on the endpoint system 104, performing generally the same functions as described with respect to engine 106C, collects endpoint condition information 104F and forwards the aggregate data set of endpoint condition information 104 to the local analysis engine residing on the endpoint system.

A host system 102 if similarly configured would behave in a similar way. Thus the analysis engine local to the endpoint system collects endpoint state data, performs local compliance analysis and makes local policy action decisions. In addition to the local system (endpoint system 104 and/or host system 102) analyzing the condition information, the local system uploads the information to the policy management system 106. The analysis engine 106C residing in the policy management system 106 examines the aggregated set of condition information across multiple or all endpoint systems simultaneously using one or more analytical methods previously described herein, e.g. a statistical analysis method, in order to look for trends across the endpoint population and to assess the overall level of compliance across the entire endpoint system population or across a specific endpoint system population sample, and will reach compliance decisions that are independent of and indeed may be different from compliance decisions made on endpoint systems due to different policy values used by the endpoint analysis engine and the policy management system analysis engine. The policy management system 106 will subsequently identify one or more policy enforcement actions that need to be taken, identify specific endpoint systems 104, 102 on which those actions need to be taken and send messages to the appropriate endpoint systems containing policy enforcement instructions. The policy management system will also send one or more policy enforcement action instructions to network access control devices such as VPN gateway, router, switch, remote access server, etc.

In this implementation, an exemplary distribution of invention components across different systems is as follows:

Endpoint system 104 components:
 Endpoint state data collection of conditions
 Endpoint state data analysis
 Compliance analysis
 Policy-based actions
 Policy data store
 Policy management functions
 Reporting functions
Policy management system 106 components:
 Policy data store
 Policy management functions
 Reporting functions
 Endpoint state data collection of conditions
 Endpoint state data analysis
 Compliance analysis engine
 Identification of policy-based actions to take and identification of specific endpoint and/or host systems that should take those actions.
Host system 102 components:
 Endpoint state data collection of conditions
 Endpoint state data analysis
 Compliance analysis
 Policy-based actions
 Policy data store
 Policy management functions
 Reporting functions Implementation Method 6—Policy Management System as In-Band Access Control Mechanism In this implementation scenario, a policy management system 106 is used to configure compliance policies that are then saved to a policy data store 106B. Policies identify what conditions 104F should be monitored by the agent monitoring components 104C, D residing on endpoint system 104 and/or host system 102. The policy management system is integrated with a network access control function such that user or application data exchanged between endpoint system 104 and host system 102 must pass through the combined policy management system/network access control function. When the endpoint system 104 tries to access the host system 102, the access control function challenges the endpoint system 104 to provide condition information (i.e. inputs to the endpoint analysis engine) and/or compliance evaluation results (i.e. outputs from the endpoint analysis engine). When the endpoint system 104 returns the requested information, the access control function relays the information to the policy management system 106.

The policy management system 106 evaluates the compliance state of the endpoint system 104 based on information provided by the endpoint system 104 and policy data residing in the policy management system policy data store 106B. The policy management system 106 then makes one or more access control decisions. Access decisions might result result in unrestricted access, total denial of access or partially restricted access (e.g. specific destination IP addresses, address ranges, applications, protocols, etc.) to network resources such as applications residing on host system 102. The access control decisions made by the policy management system 106 are passed to the access control function. The access control function then automatically configures one or more access control rules for that endpoint system 104. Thereafter all endpoint system 104 data traffic sent through the access control function is either permitted or blocked in accordance with those access control rules. The access control function periodically issues challenges to the endpoint system 104 over the life of a communications session. The challenge requires the endpoint system 104 to re-submit compliance information in order to be permitted to maintain an active session with the network access function.

As the policy management system functionality and the access control function are two separate functions, they can be installed together on a shared computing device or alternatively can be installed separately on two different computing devices interconnected by a data communications network.

It will be obvious that the several methods just described are complementary. As such, various combinations of these methods are possible and are within the scope of this invention.

Data Sharing

The raw condition information collected by the agent monitor 104C, the compliance analysis conclusions reached by the analysis engine 106C, and/or compliance actions identified as necessary by the analysis engine 106C is available to external security-centric or other software agents running on the same system via the invention's API. The information is also available to remote systems via data communications networks and traditional client-server communication protocols (e.g. HTTP) or peer-to-peer communications protocols. This allows information collected or conclusions created by the invention to be utilized by other software and network access agents as part of their host or network assessment process.

While the various endpoint, host and policy management systems are described as communicating directly with one— another, it will be understood that the invention is not thus limited. Numerous intermediary parties may be associated with the collection and forwarding of agent information from endpoint system 104 to policy management system 106. Further, numerous additional intermediary systems may be associated with communicating the policy assessment and action information from policy management system 106 to host system 102.

Remote Administrator Notification and Control

The analysis engine 106C can be configured via policy settings to send a message to an administrator via a conventional data communications network and a commonly available data communications protocol, (e.g. via POP, SMTP, FTP, HTTP, etc.) when a specific policy event occurs, for example a specific noncompliance condition. Additionally, messages can be sent to an administrator when an unrecognized event occurs. In one embodiment, a message could be sent from the client to a policy-defined server using email or any other communication method. The server would in term create or forward an email message to a policy defined email address. The email can contain a description of the event and 2 links: One to approve the action and one to deny the action. Clicking on the link would causes the IT administrator's web browser to open and send an HTTP request to the policy management server. There the IT administrator can be authenticated and prompted to confirm his intent and desires on the particular policy question. When the IT administrator successfully authenticates and submits the transaction, the policy setting is updated on the server policy data store. The next time the client (or any client in the same policy group) checks in with the server, it will automatically retrieve and apply the updated policy. Other embodiments for sending policy event notifications to an administrator are also possible and are within the scope of this invention.

There have thus been provided new and improved methods and systems for securing access to electronic resources, for example remote access to a host system and resources. The present invention applies one or more compliance assessment algorithms to collected system conditions, comparing the results to a security policy to determine if the system is in compliance with a security policy. One or more actions may be taken responsively. The present invention can use one or more of a variety of algorithms to assess large numbers of state conditions, making decisions based upon an essentially infinitely flexible security policy. The invention has commercial application in the field of electronic resource security.

Advantages of the invention include, without limitation:
- Heightened awareness and dynamic, autonomous adjustment to alert and enforcement thresholds based on condition data.
- Having a host system self-modulate what local resources are allowed to be accessed by remote systems based on its own self-assessment of conditions
- Having a policy management system alert a host system regarding conditions on the network as a whole (i.e. a plurality of end points) or specific end points and either A) explicitly instruct the host system regarding what local resources can be accessed by remote systems, or B) alert the host of conditions such that the host is able to incorporate this data into its own self assessment and subsequently self-modulate what local resources are allowed to be accessed by remote systems based on its own self-assessment of conditions
- The use of industry standard vulnerability scores or risk indexes associated with published vulnerabilities, i.e. para 0053 and subsequent
- The conversion of non-quantitative end point state info, or conditions into quantitative values
- The use of quantitative analysis models in end point inspection, analysis and policy enforcement
- Extensibility to support different and future quant models
- Simultaneous and concurrent use of different analysis models, both quant and non quant to inspect different aspects of the end point Granular inspections and a wide multitude of conditions data collected) in order to assess the end point state from a more holistic level Granular and wide ranging policy enforcement capabilities, i.e. ability to influence a number of agents and conditions simultaneously Specific use of the quant models defined herein Extensibility of condition inspection capabilities Extensibility of agents integrated with Extensibility of compliance policies Extensibility of policy enforcement actions Ability to define compliance policies in terms of logical combinations of conditions Ability to define compliance policies in terms of quantitative terms Ability to define compliance policies for non quant conditions in quant terms Ability to combine analysis methods and create N-stage analysis sequences the notion of graduated levels of compliance and graduated levels of local permissions/restrictions depending on your level of compliance While the invention has been shown and described with respect to particular embodiments, it is not thus limited. Numerous modifications, changes, enhancements and improvements within the scope of the invention will now be apparent to the reader.

What is claimed is:

1. A method for controlling the operation of an endpoint, comprising:
providing a user interface, at a computing system that is remote from the endpoint, configured to allow configuration of a plurality of policies;
maintaining the plurality of policies in a data store on the computing system;
identifying, from the plurality of policies, a plurality of operating conditions on the endpoint to evaluate;
configuring one or more software services provided by an operating system on the endpoint to monitor the plurality of operating conditions;
receiving, across a network, at the computing system, status information about the plurality of operating conditions on the endpoint, gathered by the one or more software services on the endpoint, and user information that identifies a user of the endpoint;
determining, by the computing system, a compliance state of the endpoint based on the user information and status information, and a plurality of compliance policies in the data store;
authorizing access by the endpoint to a computing resource on the network, authorization being determined by the remote computing system in response to the compliance state; and
continuing to monitor the compliance state by the endpoint and restricting access to the computing resource if the compliance state changes.

2. The method of claim 1, wherein the user interface comprises a web page.

3. The method of claim 1, further comprising requesting, at the computing system, the status information on a periodic basis.

4. The method of claim 1, wherein the endpoint comprises a mobile device.

5. The method of claim 1, further comprising configuring one or more applications running on the endpoint on the endpoint to monitor at least a subset of the plurality of operating conditions.

6. The method of claim 1, wherein the conditions comprise at least one hardware condition.

7. The method of claim 1, wherein the conditions comprise at least one software condition.

8. The method of claim 1, wherein the computing system comprises a plurality of servers.

9. A non-transitory computer readable medium containing computer instructions for controlling the operation of an endpoint, comprising:
providing a user interface, at a computing system that is remote from the endpoint, configured to allow configuration of a plurality of policies;
maintaining the plurality of policies in a data store on the computing system;
identifying, from the plurality of policies, a plurality of operating conditions on the endpoint to evaluate;
configuring one or more software services provided by an operating system on the endpoint to monitor the plurality of operating conditions;
receiving, across a network, at the computing system, status information about the plurality of operating conditions on the endpoint, gathered by the one or more software services on the endpoint, and user information that identifies a user of the endpoint;
determining, by the computing system, a compliance state of the endpoint based on the user information and status information, and a plurality of compliance policies in the data store;
authorizing access by the endpoint to a computing resource on the network, authorization being determined by the remote computing system in response to the compliance state; and
continuing to monitor the compliance state by the endpoint and restricting access to the computing resource if the compliance state changes.

10. The non-transitory computer readable medium of claim 9, wherein the user interface comprises a web page.

11. The non-transitory computer readable medium of claim 9, further comprising requesting, at the computing system, the status information on a periodic basis.

12. The non-transitory computer readable medium of claim 9, wherein the endpoint comprises a mobile device.

13. The non-transitory computer readable medium of claim 9, further comprising configuring one or more applications running on the endpoint on the endpoint to monitor at least a subset of the plurality of operating conditions.

14. The non-transitory computer readable medium of claim 9, wherein the conditions comprise at least one hardware condition.

15. The non-transitory computer readable medium of claim 9, wherein the conditions comprise at least one software condition.

16. The non-transitory computer readable medium of claim 9, wherein the computing system comprises a plurality of servers.

17. A system for controlling the operation of an endpoint, comprising:
a user interface, provided by a computing system remote from the end point, configured to allow configuration of a plurality of policies;
a data store, at the computing system, that contains the plurality of policies;
one or more software services provided by an operating system on the endpoint configured to evaluate a plurality of operating conditions identified in the plurality of policies; and one or more hardware processors at the computing system configured to:
- receive, across a network, at the computing system, status information about the plurality of operating conditions on the endpoint, gathered by the one or more software services on the endpoint, and user information that identifies a user of the endpoint,
- determine, by the computing system, a compliance state of the endpoint based on the user information and status information, and a plurality of compliance policies in the data store, and
- authorize access by the endpoint to a computing resource on the network, authorization being determined by the remote computing system in response to the compliance state.

18. The system of claim 17, wherein the user interface comprises a web page.

19. The system of claim 17, further comprising requesting, at the computing system, the status information on a periodic basis.

20. The system of claim 17, wherein the endpoint comprises a mobile device.

21. The system of claim 17, further comprising configuring one or more applications running on the endpoint on the endpoint to monitor at least a subset of the plurality of operating conditions.

22. The system of claim 17, wherein the conditions comprise at least one hardware condition.

23. The system of claim 17, wherein the conditions comprise at least one software condition.

24. The system of claim 17, wherein the computing system comprises a plurality of servers.

* * * * *